(12) United States Patent
Ida et al.

(10) Patent No.: US 7,764,848 B2
(45) Date of Patent: Jul. 27, 2010

(54) HIGH RESOLUTION ENABLING APPARATUS AND METHOD

(75) Inventors: Takashi Ida, Kawasaki (JP); Kenzo Isogawa, Yokohama (JP); Nobuyuki Matsumoto, Inagi (JP); Toshimitsu Kaneko, Kawasaki (JP); Hidenori Takeshima, Ebina (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 918 days.

(21) Appl. No.: 11/558,219

(22) Filed: Nov. 9, 2006

(65) Prior Publication Data

US 2007/0269137 A1 Nov. 22, 2007

(30) Foreign Application Priority Data

May 22, 2006 (JP) ............................. 2006-142074

(51) Int. Cl.
G06K 9/32 (2006.01)
G06K 15/02 (2006.01)
G09G 5/00 (2006.01)
H04N 5/262 (2006.01)

(52) U.S. Cl. ...................... 382/299; 358/1.2; 345/660; 348/240.99

(58) Field of Classification Search ......... 382/298–299, 382/300, 305, 312; 375/240.1; 345/660, 345/671–672; 348/240.99; 358/1.2, 528
See application file for complete search history.

(56) References Cited

U.S. PATENT DOCUMENTS

| | | | |
|---|---|---|---|
| 5,274,466 A | 12/1993 | Ida et al. | |
| 6,055,335 A | 4/2000 | Ida et al. | |
| 6,269,175 B1 * | 7/2001 | Hanna et al. | 382/107 |
| 6,466,618 B1 * | 10/2002 | Messing et al. | 375/240.01 |
| 6,650,704 B1 * | 11/2003 | Carlson et al. | 375/240.01 |

(Continued)

FOREIGN PATENT DOCUMENTS

JP 2000-188680 7/2000

(Continued)

OTHER PUBLICATIONS

Nimish R. Shah, et al., "Resolution Enhancement of Color Video Sequences", IEEE Transactions on Image Processing, vol. 8, No. 6, XP011026334, Jun. 1999, pp. 879-885.

(Continued)

*Primary Examiner*—Kanji Patel
(74) *Attorney, Agent, or Firm*—Oblon, Spivak, McClelland, Maier & Neustadt, L.L.P.

(57) ABSTRACT

An apparatus includes unit acquiring, from an image source, an image represented by pixel values indicating brightness levels, unit setting, as a reference frame, one frame, unit sequentially setting, to be target pixels, each of pixels in one or more frames, unit setting target-image regions including the target pixels, unit searching the reference frame for similar-target-image regions similar to each of the target-image regions in a change pattern of pixel values, unit selecting, from the similar-target-image regions, corresponding points corresponding to each of the target pixels, unit setting sample values concerning brightness at the corresponding points to a pixel value of a target pixel corresponding to the corresponding points, and unit computing pixel values in a high-resolution image corresponding to the reference frame, based on the sample values and the corresponding points, the high-resolution image containing a larger number of pixels than pixels in the reference frame.

19 Claims, 31 Drawing Sheets

U.S. PATENT DOCUMENTS 7,215,831 B2 * 5/2007 Altunbasak et al. ......... 382/299

FOREIGN PATENT DOCUMENTS

| JP | 2004-56789 | 2/2004 |
|----|------------|--------|
| JP | 2004-120627 | 4/2004 |

OTHER PUBLICATIONS

A Buades, et al., "A Review of Image Denoising Algorithms, with a New One", Multiscale Model Simulation, vol. 4, No. 2, XP002496485, Jul. 18, 2005, pp. 490-530.

Alexei A Efros, et al., "Texture Synthesis by Non-parametric Sampling", Computer Vision 1999. The proceedings of the Seventh IEEE International Conference, IEEE Comput. Soc, US, vol. 2, XP010350534, Sep. 20, 1999, pp. 1033-1038.

Zoran A. Ivanovski, et al, "Selective Bayesian Estimation for Efficient Super-Resolution", Signal Processing and Information Technology, 2004. Proceedings of the Fourth IEEE International Symposium, XP010800545, Dec. 18-21, 2004, pp. 433-436.

Hsueh-Ming Hang, et al., "Motion Estimation for Video Coding Standards", Journal of VLSI Signal Processing Systems for Signal, Image, and Video Technology, vol. 17, No. 2/03, XP000724575, Nov. 1, 1997, pp. 113-136.

Hiêp Luong, et al., "An Image Interpolation Scheme for Repetitive Structures", Image Analysis and Recognition Lecture Notes in Computer Science; :LNCS, vol. 4141, XP019043688, Sep. 22, 2006, pp. 105-115.

Masao Shimizu, et al., "Sub-Pixel Estimation Error Cancellation on Area-Based Matching", International Journal of Computer Vision, vol. 63, No. 3, XP019216471, Jul. 1, 2005.

Isaac Amidror, "Scattered Data Interpolation Methods for Electronic Imaging Systems: a Survey", Journal of Electronic Imaging, SPIE/IS &T, vol. 11, No. 2, XP001115909, Apr. 1, 2002, pp. 157-176.

U.S. Appl. No. 12/398,742, filed Mar. 5, 2009, Ida, et al.

U.S. Appl. No. 12/397,747, filed Mar. 4, 2009, Matsumoto, et al.

U.S. Appl. No. 12/408,918, filed Mar. 23, 2009, Takeshima, et al.

U.S. Appl. No. 11/677,719, filed Feb. 22, 2007, Taguchi et al.

U.S. Appl. No. 11/695,820, filed Apr. 3, 2007, Taguchi, et al.

U.S. Appl. No. 11/828,397, filed Jul. 26, 2007, Matsumoto, et al.

U.S. Appl. No. 11/461,662, filed Aug. 1, 2006, Nobuyuki Matsumoto, et al.

Sung Cheol Park, et al., "Super-Resolution Image Reconstruction: A Technical Overview", IEEE Signal Processing Magazine, May 2003, pp. 21-36.

Masao Shimizu, et al., "Significance and Attributes of Sub-Pixel Estimation on Area-Based Matching", IEICE Tran. Information and Systems, PT. 2, vol. J85-D-II, No. 12, Dec. 2002, pp. 1791-1800.

U.S. Appl. No. 12/233,030, filed Sep. 18, 2008, Takeshima, et al.

U.S. Appl. No. 12/233,155, filed Sep. 18, 2008, Taguchi, et al.

U.S. Appl. No. 12/234,164, filed Sep. 19, 2008, Takeshima, et al.

U.S. Appl. No. 12/234,111, filed Sep. 19, 2008, Takeshima, et al.

* cited by examiner

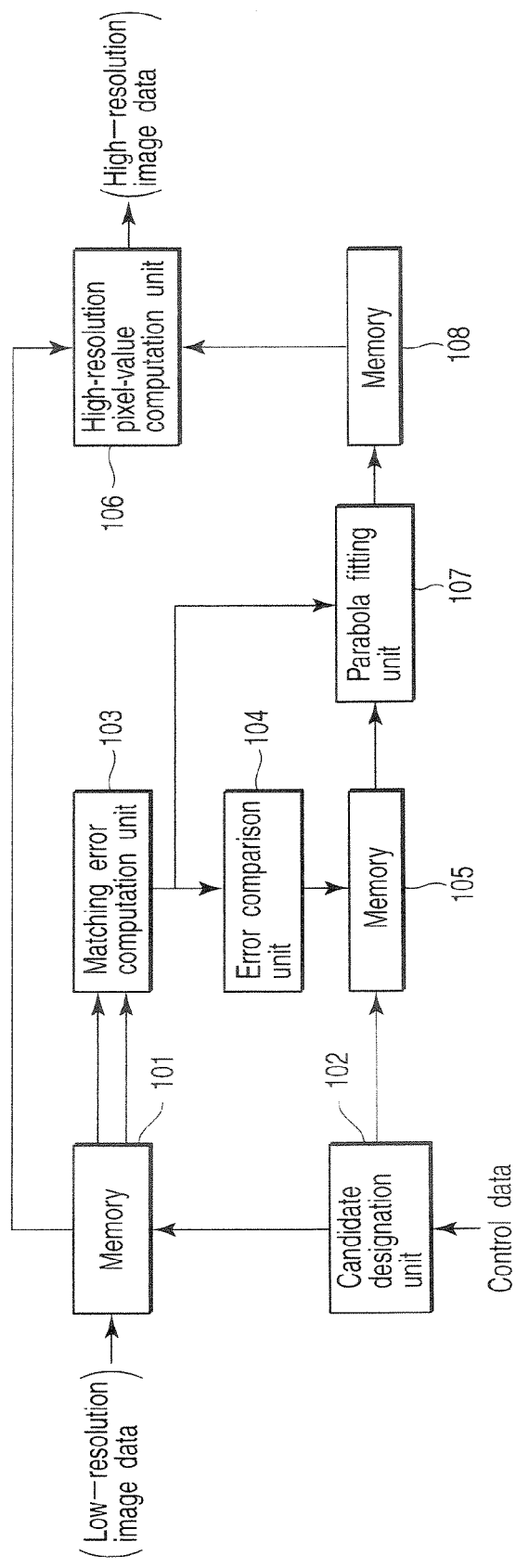
F I G. 1 A

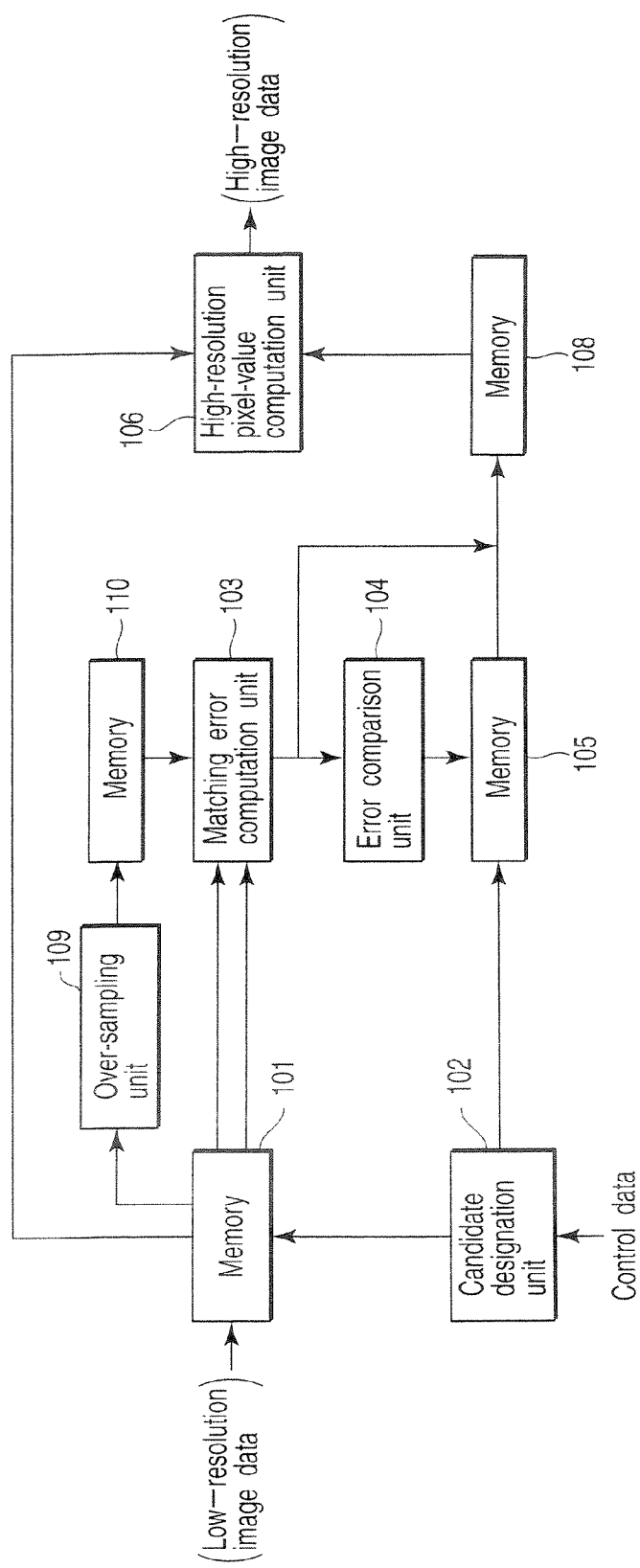
F I G. 1 B

Low-resolution image of reference frame

High-resolution image of reference frame

Case where intervals of pixels of low-resolution image are made equal to those of pixels of high-resolution image Positional relationship between sample points in reference frame Vector search space Shape of matching block FIG.25
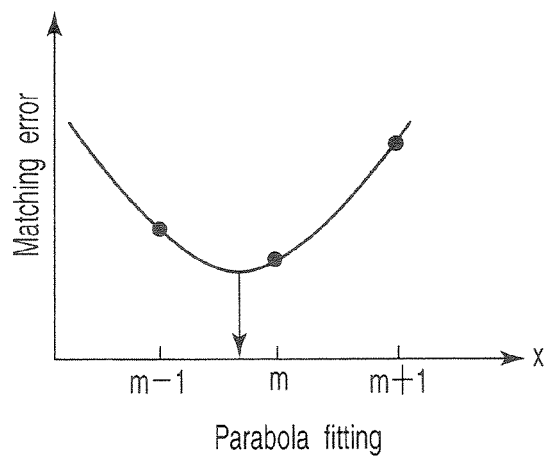
Parabola fitting
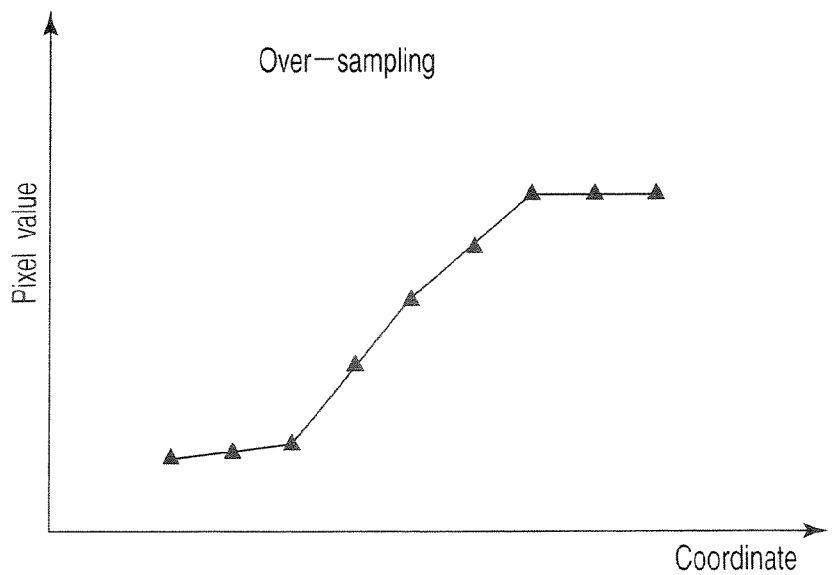
FIG.26

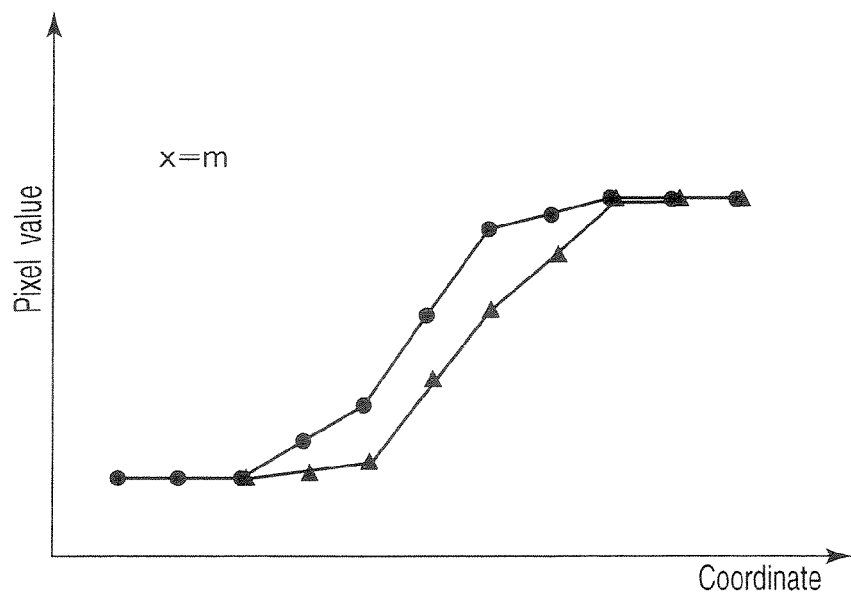
F I G. 29
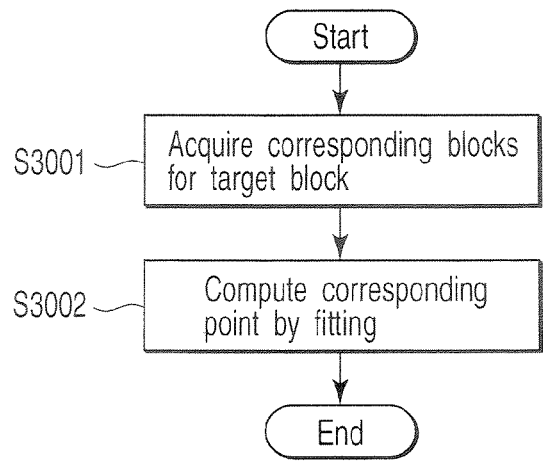
F I G. 30

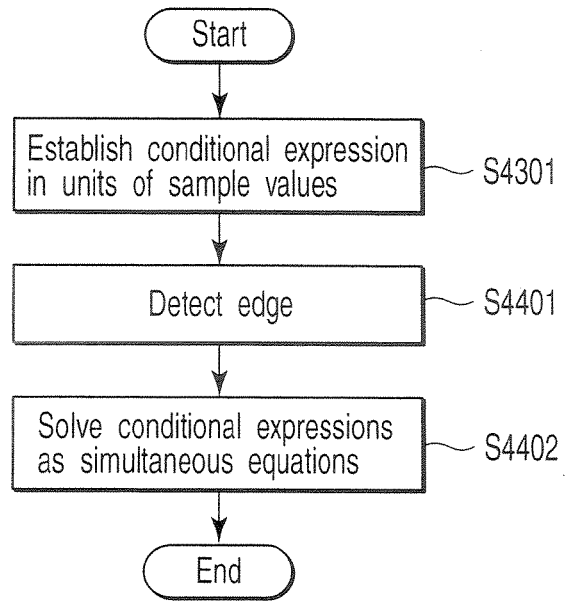
F I G. 4 4
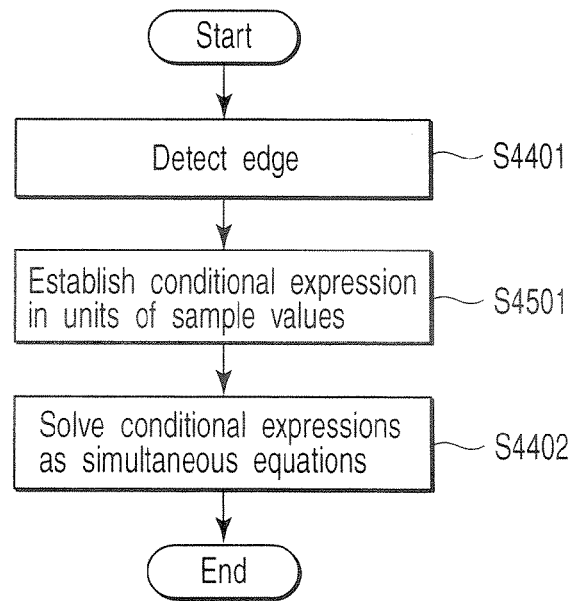
F I G. 4 5

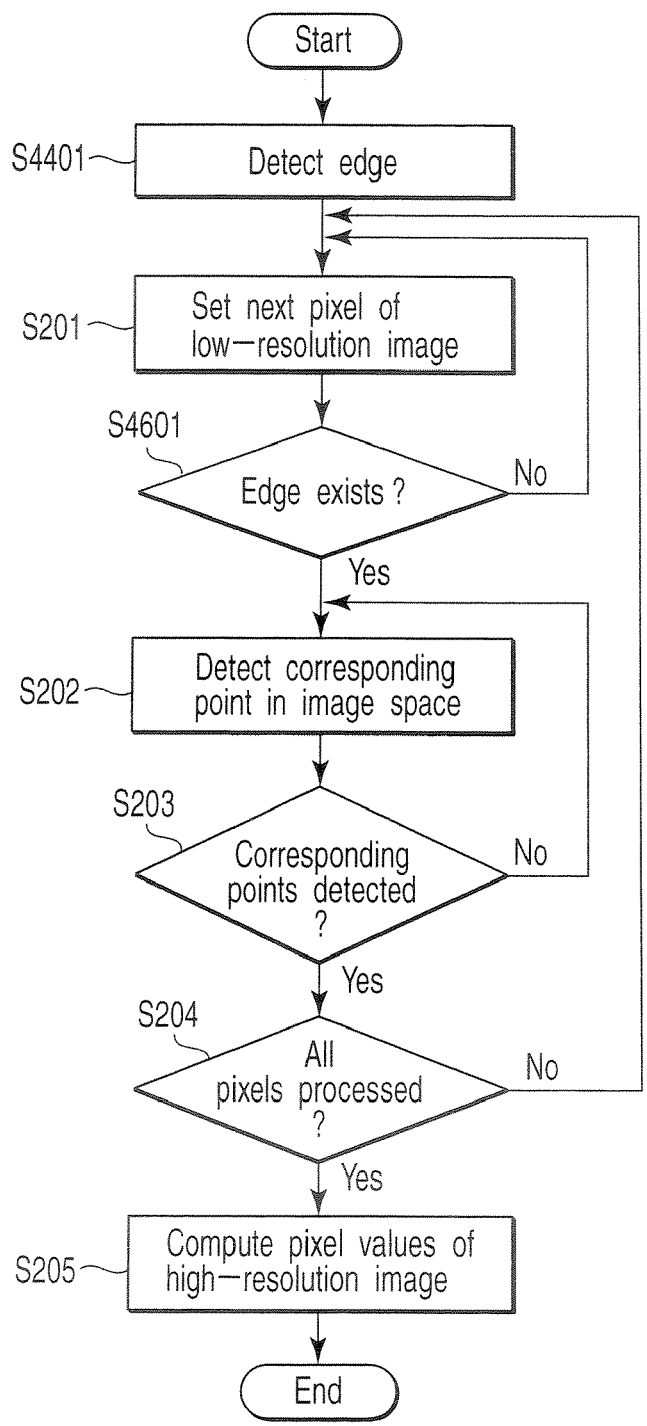
F I G. 4 6

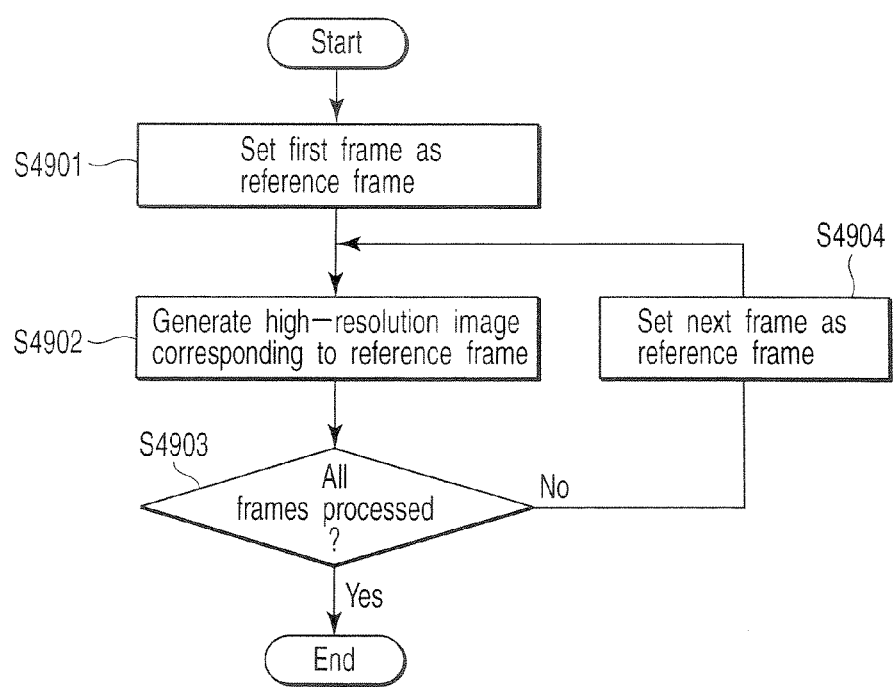
F I G. 4 9

HIGH RESOLUTION ENABLING APPARATUS AND METHOD

CROSS-REFERENCE TO RELATED APPLICATIONS

This application is based upon and claims the benefit of priority from prior Japanese Patent Application No. 2006-142074, filed May 22, 2006, the entire contents of which are incorporated herein by reference.

BACKGROUND OF THE INVENTION

1. Field of the Invention

The present invention relates to a high resolution enabling apparatus and method for converting, into image data of higher resolution, image data acquired by photography using a camera, or received by a TV set.

2. Description of the Related Art

TV sets and displays of a large number of pixels, i.e., of high resolution, have recently been spread. When an image is displayed on a TV set or display, the number of pixels included in image data is converted into the number of pixels included in the panel. In particular, in high resolution enabling conversion in which the number of pixels is increased, a frames degradation inverse conversion method is known as a method for acquiring a sharper image than by linear interpolation (see, for example, JP-A 2000-188680 (KOKAI) [pages 3 to 7, FIG. 22], S. Park, et al. "Super-Resolution Image Reconstruction: A Technical Overview", IEEE Signal Proceeding Magazine, USA, IEEE, May 2003, pp. 21-36).

In the frames degradation inverse conversion method, attention is paid to the fact that a subject appearing in a reference frame also appears in another frame, and the movement of the subject is detected with a higher accuracy than the order of the pixel interval, thereby acquiring a plurality of sample values detected in positions lightly displaced from each other, in which a certain local portion of the subject is positioned. By this process, higher resolution is acquired.

The frames degradation inverse conversion method will now be described in more detail. In this method, when frames of low resolution are arranged in a time-series manner, they are sequentially converted into frames of high resolution. For instance, three successive frames of a moving image acquired by photographing a moving car are used as low-resolution images, and one of the three frames is used as a reference frame to be realized as a high-resolution image. The horizontal and vertical pixels of the reference frame are, for example, doubled as a high-resolution image. For the pixels of an unknown high-resolution image, only a small number of pixels of a low-resolution image, i.e., only a small number of known sample values, are prepared. Even in this state, each pixel value of a high-resolution image can be estimated. However, if the number of known sample values is increased, a more accurate high-resolution image can be acquired. To this end, in the frames degradation inverse conversion method, it is detected where in the reference frame the subject, which is positioned at a certain pixel position of a low-resolution image other than the reference frame, is positioned. Further, the pixel value of the subject is used as a sample value for the corresponding point in the reference frame.

Specifically, a block of (several pixels×several pixels) including a certain pixel as the center is extracted from a low-resolution image, and a block having the same size as the extracted block and including pixel values close to those of the extracted block is searched for in the reference frame. The search is performed with the accuracy order of sub-pixel (see, for example, Masao Shimizu and Masatoshi Okutomi "Significance and Attributes of Sub-Pixel Estimation on Area-Based Matching" IEICE Tran. Information and Systems. PT. 2, December 2002, No. 12, vol. J85-D-II pp. 1791-1800). The center of the searched block is set as the point corresponding to the certain pixel. As a result, point A corresponding to another frame and point B corresponding to the reference frame are related to each other as the same portion of a subject. This relationship is expressed by the motion vector using point A as the start point and point B as the end point. Since the search is performed with the accuracy order of sub-pixel, the start point of each motion vector is generally the position of a certain pixel and the end point is the position at which no pixel exists. Such motion vectors are acquired for all pixels of the low-resolution image. Further, motion vectors using respective pixels as their start points and related to the reference frame are detected in another low-resolution image. After that, the end and start points of the motion vectors are set as sample values. Lastly, from the thus-set nonuniform sample values, the pixel values of a high-resolution image uniformly arranged in a lattice are acquired. These processes are performed using, for example, nonuniform interpolation or POSC method (see, for example, JP-A 2000-188680(KOKAI) [pages 3 to 7, FIG. 22], S. Park, et al. "Super-Resolution Image Reconstruction: A Technical Overview", IEEE Signal Proceeding Magazine, USA, IEEE, May 2003, pp. 21-36).

Although the above-described frames degradation inverse conversion method can provide a sharp high-resolution image, it requires a large number of low-resolution images to acquire a sufficient number of sample values, and hence requires a large memory capacity.

BRIEF SUMMARY OF THE INVENTION

In accordance with an aspect of the invention, there is provided a high-resolution enabling apparatus comprising: an acquisition unit configured to acquire, from an image source, an image represented by pixel values indicating brightness levels; a first setting unit configured to set, as a reference frame, one frame included in the image; a second setting unit configured to sequentially set, to be a plurality of target pixels, a plurality of pixels included in one or more frames included in the image, respectively; a third setting unit configured to set a plurality of target image regions including the target pixels, respectively; a searching unit configured to search the reference frame for a plurality of similar target image regions similar to each of the target image regions in a change pattern of pixel values; a selection unit configured to select, from the similar target image regions of the reference frame, a plurality of corresponding points corresponding to each of the target pixels; a fourth setting unit configured to set a plurality of sample values concerning brightness at the corresponding points to a pixel value of a target pixel corresponding to the corresponding points; and a computation unit configured to compute a plurality of pixel values included in a high resolution image corresponding to the reference frame, based on the sample values and the corresponding points, the high resolution image containing a larger number of pixels than pixels contained in the reference frame.

In accordance with another aspect of the invention, there is provided a high-resolution enabling apparatus comprising: an acquisition unit configured to acquire, from an image source, an image represented by pixel values indicating brightness levels; a division unit configured to divide one frame, included in the image, into a plurality of vertical or horizontal pixel lines; a first setting unit configured to set, as a reference pixel line, one pixel line included in the pixel lines; a second setting unit configured to sequentially set, to be a plurality of target pixels, a plurality of pixels included in one or more frames included in the image other than the reference pixel line, respectively; a third setting unit configured to set a plurality of target image regions including the target pixels, respectively; a searching unit configured to search the reference pixel line for a plurality of similar target image regions similar to each of the target image regions in a change pattern of pixel values; a selection unit configured to select, from the similar target image regions of the reference pixel line, a plurality of corresponding points corresponding to each of the target pixels; a fourth setting unit configured to set a plurality of sample values concerning brightness at the corresponding points to a pixel value of a target pixel corresponding to the corresponding points; and a computation unit configured to compute a plurality of pixel values included in a high resolution image corresponding to the reference pixel line, based on the sample values and the corresponding points, the high resolution image containing a larger number of pixels than pixels contained in the reference pixel line.

BRIEF DESCRIPTION OF THE SEVERAL VIEWS OF THE DRAWING

FIG. 1A is a block diagram illustrating a high resolution enabling apparatus according to embodiments;

FIG. 1B is a block diagram illustrating the configuration of the high resolution enabling apparatus when it employs an over-sampling method is utilized;

FIG. 19 is a view useful in explaining search ranges in which errors with respect to the target block of FIG. 18 is searched for;

FIG. 25 is a view useful in explaining parabola fitting;

FIG. 26 is a graph illustrating the relationship between the coordinate and pixel value assumed when the frame of FIG. 13 is subjected linear interpolation in over-sampling;

FIG. 29 is a graph corresponding to FIG. 15 and acquired based on FIGS. 26 and 27;

FIG. 30 is a flowchart illustrating an operation example for acquiring corresponding points using fitting;

FIG. 44 is a flowchart illustrating the operation of FIG. 43 performed near an edge of an image;

FIG. 45 is a flowchart illustrating an operation example for realizing high resolution only at an edge;

FIG. 46 is a flowchart illustrating an example of a detailed operation performed at step S4501 of FIG. 45;

FIG. 49 is a flowchart illustrating an operation example for realizing high resolution of moving image frames that are sequentially set as reference frames;

DETAILED DESCRIPTION OF THE INVENTION

Figure 2:
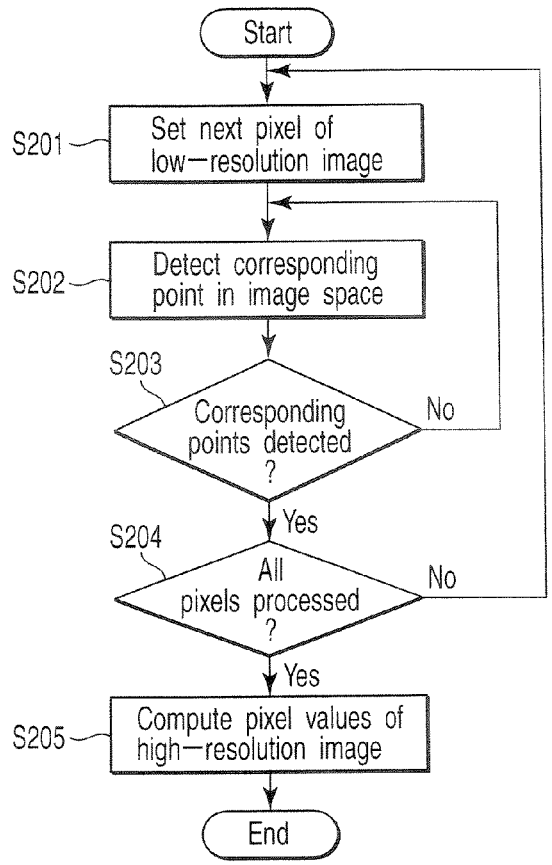
FIG. 2 is a flowchart illustrating an operation example of a high resolution enabling apparatus according to a first embodiment.

High-resolution enabling apparatuses and methods according to embodiments of the invention will be described in detail with reference to the accompanying drawings.

The high-resolution enabling apparatuses and methods according to the embodiments have been developed by paying attention to the fact that a brightness varying pattern similar to the brightness varying pattern of a portion of a subject exists near a portion of the subject adjacent to the first-mentioned portion. Namely, the high-resolution enabling apparatuses and methods detect the positions of sample values included in each of brightness varying patterns that are contained in a single frame.

The high-resolution enabling apparatuses and methods according to the embodiments can provide a sharp high-resolution image simply using a memory of a small capacity.

Referring to FIG. 1A, a description will be given of a high-resolution enabling apparatus according to embodiments.

The high-resolution enabling apparatus according of the embodiments comprises a memory 101, candidate designation unit 102, matching error computation unit 103, error comparison unit 104, memory 105, high-resolution pixel-value computation unit 106, parabola fitting unit 107 and memory 108. In the description below, like reference numbers denote like elements.

The memory 101 acquires and stores low-resolution image data. The low-resolution image data may be moving image data or still image data, and is acquired from an image source, i.e., an image data generation unit (not shown), such as a camera or TV set. More specifically, the low-resolution image data is image data acquired by photography using a camera, or received by a TV set. Further, the memory 101 receives, from the candidate designation unit 102, a signal indicating an image portion to be subjected to error computation, and a signal indicating the position of a target pixel, and outputs, to the matching error computation unit 103, image data around the target pixel, and image data corresponding to the image portion subjected to error computation. The memory 101 also supplies the high-resolution pixel-value computation unit 106 with low-resolution image data. At this time, the memory 101 supplies the image data in units of images (for example, in units of frames) (first embodiment), or in units of lines in each image (frame) (second embodiment), or in units of blocks in each image (frame) (third embodiment). In the case of supplying the image data in units of lines, the memory 101 incorporates a line memory (not shown), and stores therein line image data corresponding to one frame. The memory 101 further sets a reference frame, described later.

The candidate designation unit 102 receives control data including data that designates the range of search, then generates a signal indicating an image portion to be subjected to error computation and a signal indicating the position of a target pixel, based on the search range, and outputs these signals to the memories 101 and 105. The search range will be described later with reference to FIG. 19.

The matching error computation unit 103 acquires, from the memory 101, image data around the target pixel and image data corresponding to the image portion that is subjected to error computation and included in the range of search, and computes the error therebetween, utilizing, for example, a sum of absolute difference or sum of squared difference. The image data around the target pixel is, for example, data concerning a target block. The matching error computation unit 103 successively changes, from one to another, image portions falling within the search range and subjected to error computation, thereby successively detecting the error between the image data around each target pixel and the image data corresponding to the image portion subjected to error computation.

The error comparison unit 104 compares the errors corresponding to a plurality of image portions falling within the search range. For example, the unit 104 acquires, as a plurality of corresponding pixel points, a plurality of positions corresponding to the image portions, the errors between which are substantially minimum.

The memory 105 acquires, from the candidate designation unit 102, the corresponding pixel points computed by the error comparison unit 104.

Based on the corresponding pixel points, the parabola fitting unit 107 performs sub-pixel estimation utilizing parabola fitting, thereby determining corresponding points. Concerning each target pixel, two or more corresponding points are acquired. Particulars concerning the parabola fitting unit 107 will be described later with reference to FIGS. 25 and 30.

The memory 108 stores position information indicating the corresponding points acquired by the parabola fitting unit 107.

After corresponding points for preset pixels included in a low-resolution image are determined, the high-resolution pixel-value computation unit 106 acquires image data corresponding to the low-resolution image from the memory 101, and the corresponding points from the memory 108. For instance, the computation unit 106 establishes, in units of pixels of the low-resolution image, a conditional expression based on each corresponding point, then solves the total conditional expressions as simultaneous equations to determine the pixel values of a high-resolution image to be realized, and outputs the determined pixel values.

Referring to FIG. 1B, a description will be given of the configuration of the high-resolution enabling apparatus assumed when over-sampling is utilized instead of parabola fitting.

The configuration shown in FIG. 1B differs from that of FIG. 1A in that the former employs an over-sampling unit 109 and memory 110, instead of the parabola fitting unit 107.

The over-sampling unit 109 increases the amount of low-resolution data by reducing the interval of error computation. Particulars concerning over-sampling will be described later with reference to FIGS. 26 and 31.

The memory 110 temporarily stores the data sampled by the over-sampling unit 109, and supplies it to the matching error computation unit 103.

First Embodiment

Referring now to FIG. 2, an operation example of the high-resolution enabling apparatus according to the embodiments will be described. Images may hereinafter be called frames.

At step S201, the candidate designation unit 102 sets, as target pixels, pixels in a low-resolution image in a preset order. In the case of a still image, a so-called raster order, for example, is employed, in which the target pixels are successively selected by rightward scanning horizontal pixel lines in the order beginning with the upper left pixel and ending with the lower right pixel. In the case of a moving image, frames are successively selected, and the pixels in each frame are selected in the above-mentioned raster order. The relationship between the low-resolution frame and high-resolution frame of a moving image will be described later with reference to FIGS. 3 to 8.

At step S202, the matching error computation unit 103, error comparison unit 104 and parabola fitting unit 107 detect points (hereinafter referred to as "corresponding pixel points" or "corresponding points") corresponding to a target pixel in the image space of a reference frame.

At step S203, the matching error computation unit 103 determines whether a preset number of corresponding points are acquired for a target pixel. If they are not yet acquired, the program returns to step S202, where another corresponding point is detected, whereas if they are already acquired, the program proceeds to step S204. Steps S202 and S203 will be described later in detail with reference to FIGS. 9 to 17.

At step S204, the matching error computation unit 103 determines whether corresponding points for all pixels in a low-resolution image used for realizing high resolution are already acquired. If the answer to this question is NO, the program returns to step S201, where processing concerning the next pixel is executed, whereas if the answer is YES, the program proceeds to step S205.

At step S205, the high-resolution pixel-value computation unit 106 computes the pixel values of a high-resolution image for the reference frame, using the pixel values of the low-resolution image and the acquired corresponding points, thereby terminating the process. The way of computing the pixel values of a high-resolution image will be described later with reference to FIG. 40.

Referring now to FIGS. 3 to 8, a description will be given of the relationship between the high-resolution frame and low-resolution frame in a moving image.

Figure 3:
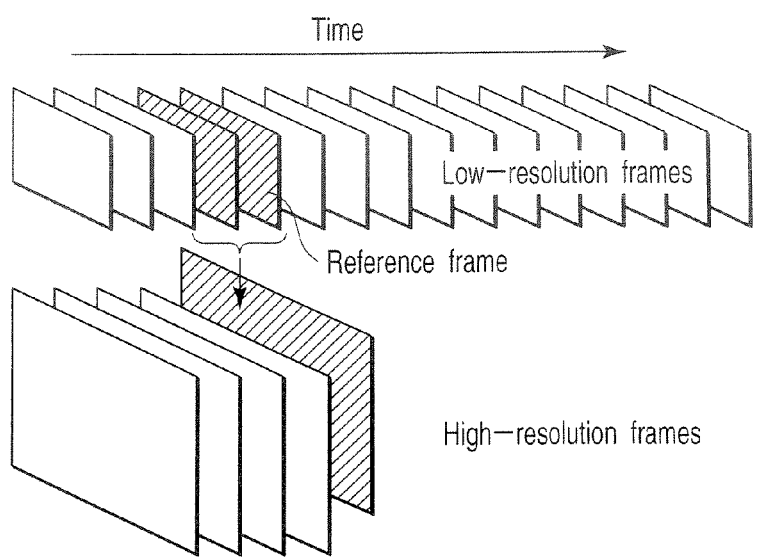
FIG. 3 is a view useful in explaining generation of a high-resolution frame from two low-resolution frames.
Figure 4:
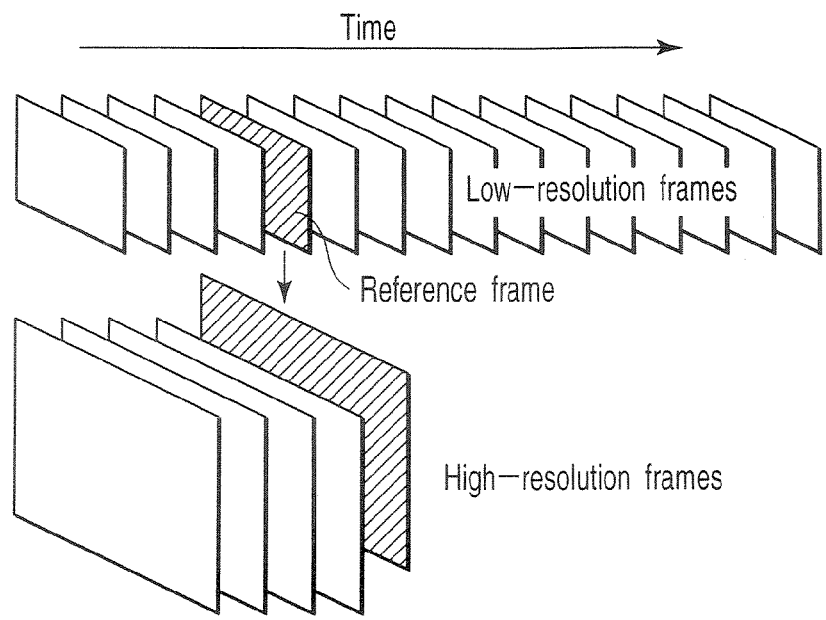
FIG. 4 is a view useful in explaining generation of a high-resolution frame from a single low-resolution frame.

The high-resolution enabling apparatus of the embodiment successively generates high-resolution frames using input low-resolution frames. FIG. 3 shows the time when the high-resolution enabling apparatus generates the $5^{th}$ high-resolution frame. The low-resolution frame, i.e., the $5^{th}$ frame in FIG. 3, currently subjected to a process for realizing high resolution will be hereinafter referred to as a "reference frame". In the case of FIG. 3, to enhance the resolution of the reference frame, the reference frame and the two frames generated immediately before the reference frame are subjected to the process. On the other hand, in the case of FIG. 4, only the reference frame is subjected to the process. Further, in the case of a still image, since only one low-resolution image is input, it corresponds to the reference frame and is subjected to the process for realizing high resolution. For facilitating the description, a still image is expressed as a frame.

Figure 5:
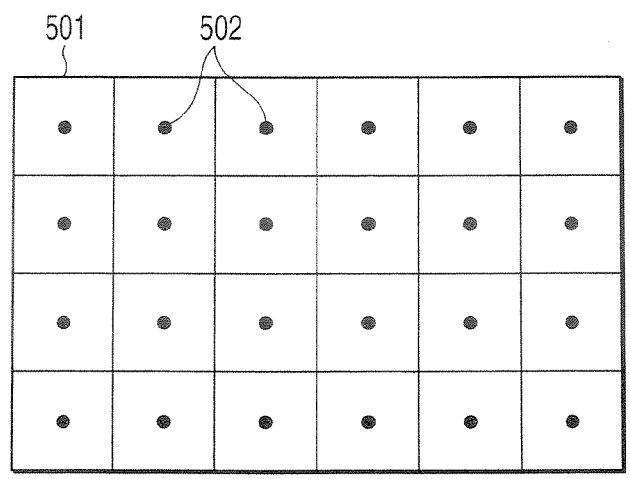
FIG. 5 is a view illustrating the positional relationship between pixels of a low-resolution image.
Figure 6:
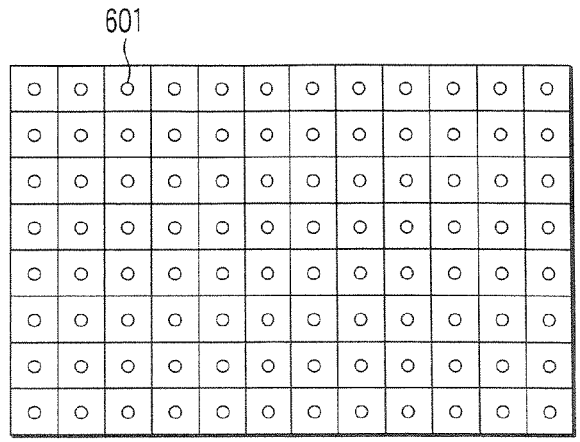
FIG. 6 is a view illustrating an image acquired by increasing the resolution of the image of FIG. 5.
Figure 7:
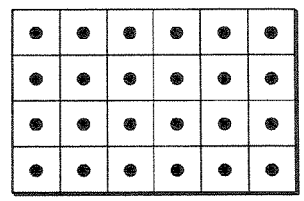
FIG. 7 is a view illustrating a low-resolution image acquired by adjusting the pixel interval of the image of FIG. 5 to that of the image of FIG. 6.

FIG. 5 shows the positional relationship between the image space 501 and pixels 502 of a low-resolution image as a reference frame. In general, in the image space of an image, the brightness distribution is uniform. However, in the case of the digital image processed in the embodiment, pixels are arranged in the image space as discrete sample points, and a certain brightness level represents a number of brightness levels around it. In the case of FIG. 5, the image space is divided into 24 (=6[columns]×4[rows]) squares, and 24 pixels are arranged as sample points in the central portions of the 24 squares, as is indicated by black dots. FIG. 6 shows a case where the resolution of the low-resolution image space of FIG. 5 is doubled in both the horizontal and vertical directions, as is indicated by white dots 601. As a result, the pixel interval of the resultant high-resolution image becomes ½ that of the low-resolution image. If the original low-resolution image is expressed with the same pixel interval as the high-resolution image, the former will have a smaller size than the latter as shown in FIG. 7.

As described above, if the low-resolution image is rendered to the same size as the high-resolution image, the former has a wider pixel interval than the latter. In contrast, if the low-resolution image is rendered to the same pixel interval as the high-resolution image, the former has a smaller size than the latter. These represent the same thing. For facilitating the description, the low-resolution image may be rendered as shown in FIG. 5 or 7.

Figure 8:
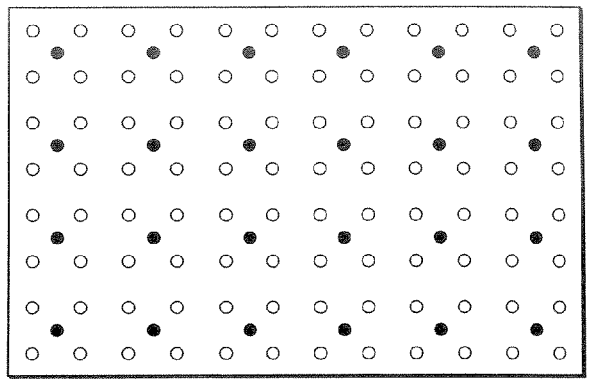
FIG. 8 is a view illustrating the positional relationship of the pixels of the images shown in FIGS. 5 and 6.

FIG. 8 shows a case where the sample points (pixel points) of the low-resolution image are denoted by black dots, and those of the high-resolution image are denoted by white dots. The process for realizing high resolution is to acquire the brightness levels of the sample points denoted by white dots, based on the brightness levels of the sample points denoted by black dots.

Referring to FIGS. 9 to 17, a detailed description will be given of steps S202 and S203. Although image spaces 904 and 906 include a small number of pixels for easy viewing, they actually include several hundreds of pixels in each of the horizontal and vertical directions. Further, for easy viewing, the images of the spaces are expressed as digital images. Actually, however, they are density-varied images. In the image space 908 of the high-resolution image, the pixels 909 of the high-resolution image are denoted by white dots, and the pixels 910 of the low-resolution image are denoted by black dots.

Figure 9:
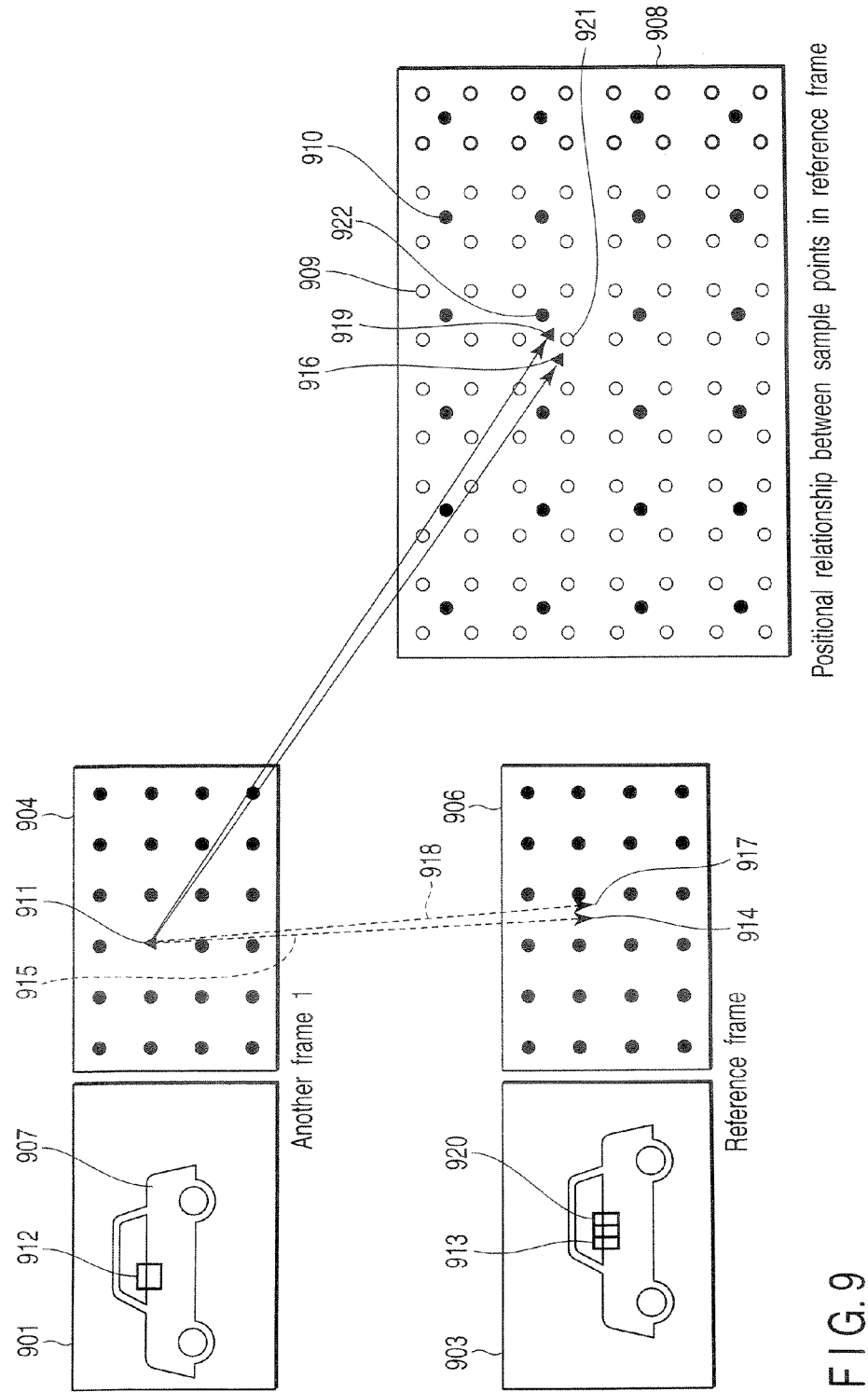
FIG. 9 is a view useful in explaining steps S202 and S203 shown in FIG. 2.

In the case of FIG. 9, assume that a moving image acquired by photographing a moving vehicle 907 includes two successive frames 901 and 903. The high-resolution enabling apparatus uses frame 903 as a reference frame and subjects it to a process for realizing high resolution. FIG. 9 shows the case where point 914 corresponding to target pixel 911 in the image space of frame 901 is detected in the image space 906 of frame 903. The image space will be described later with reference to FIG. 24.

Target pixel 911 in the image space 904 of frame 901 is related to corresponding point 914 in the image space 906 of reference frame 903 by corresponding vector 915 using target pixel 911 as its start point and corresponding point 914 as its end point. To detect the corresponding point, the candidate designation unit 102 extracts, from frame 901, a rectangular block of, for example, (5×5) or (3×3) pixels, which includes target pixel 911 at the center and serves as a target block. The matching error computation unit 103 searches reference frame 903 for a portion that is similar in pixel-value variation pattern to the extracted target block. Particulars concerning the search will be described later with reference to FIGS. 18 and 19.

Figure 10:
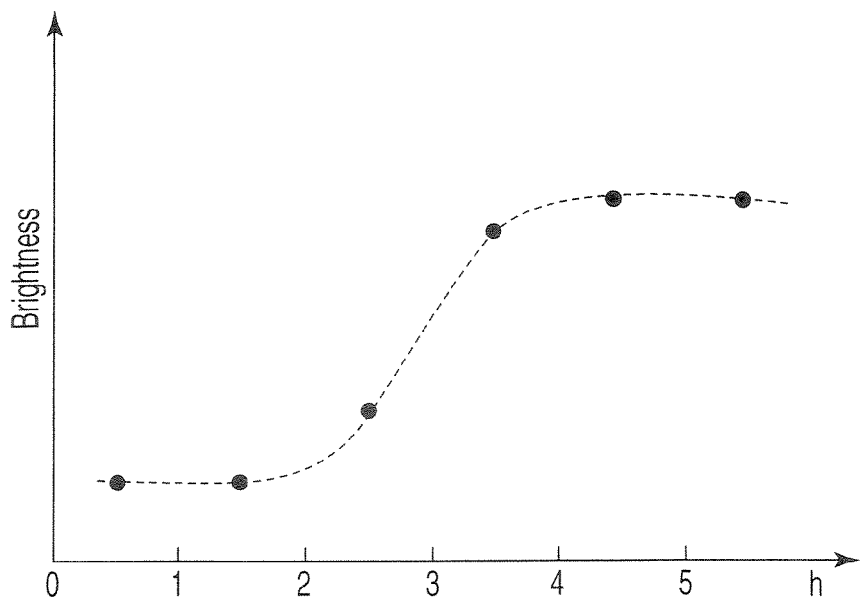
FIG. 10 is a graph illustrating the relationship between the horizontal-axis position on a certain reference frame and the brightness.
Figure 11:
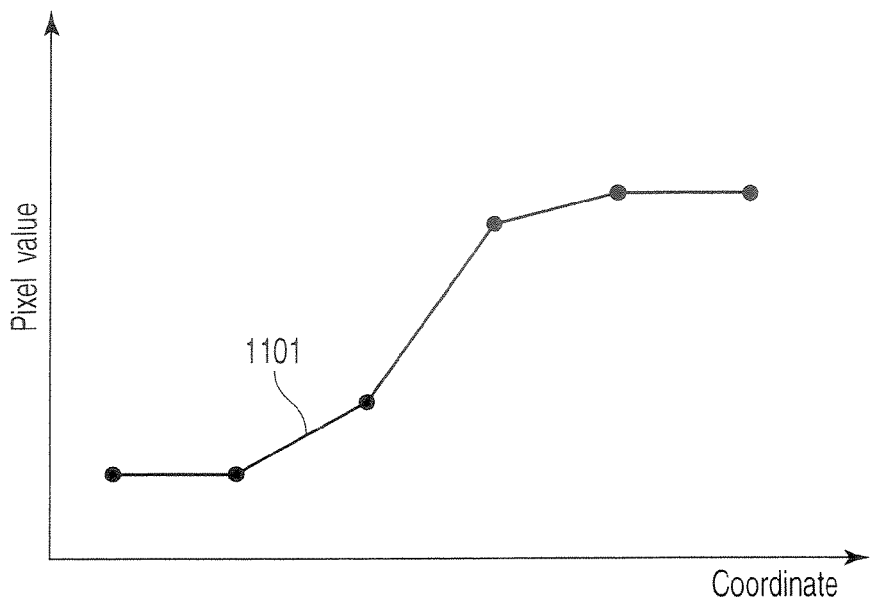
FIG. 11 is a graph illustrating the relationship between the position coordinates and pixel value in image data acquired by converting the brightness levels shown in FIG. 10 into pixel values.

Referring then to FIGS. 10 to 13, steps S202 and S203 will be described, using, as an example, a state assumed when a reference frame is acquired by photography. In FIG. 10, the vertical axis of the image space is fixed so as to include the sample points of the low-resolution image. The horizontal axis indicates the horizontal axis h of the image space, and the vertical axis indicates the brightness. Further, the broken line indicates variation in the brightness of a subject, and the black dots indicate the points sampled by pixels during photography. The intervals of sample points are set to 1. FIG. 11 shows the image data of the reference frame in which the sampled brightness levels are acquired as pixel values. In the image data shown in FIG. 11, sampling makes a change in brightness more gentle than the actual change, as is indicated by, for example, a change 1101 between the $2^{nd}$ and $3^{rd}$ sample points from the left. This means that a sharp image cannot be generated using only reference frame pixels.

Figure 12:
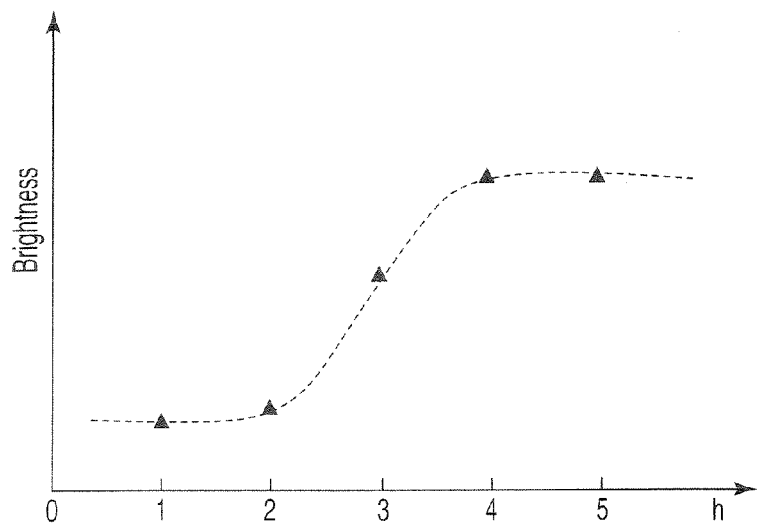
FIG. 12 is a graph illustrating the relationship between the horizontal-axis position on another frame and the brightness.
Figure 13:
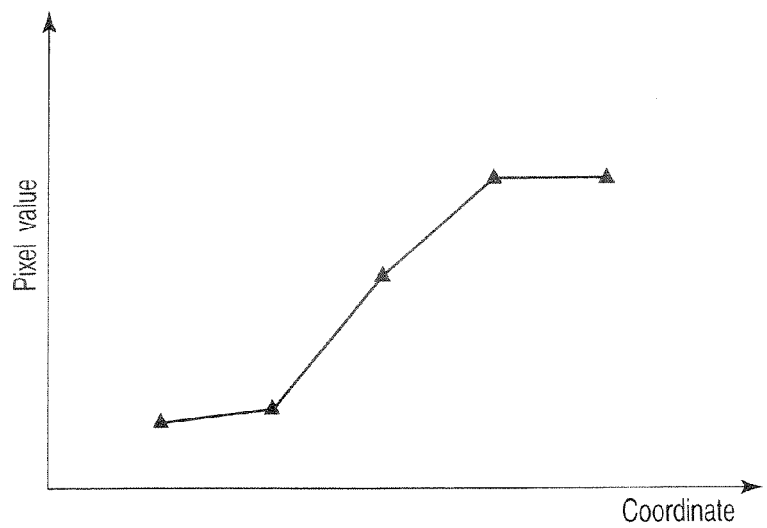
FIG. 13 is a graph illustrating the relationship between the position coordinates and pixel value in image data acquired by converting the brightness levels shown in FIG. 12 into pixel values.

FIG. 12 shows a state assumed when another frame indicating the same portion of the subject is acquired by photography, and FIG. 13 shows image data corresponding to this frame. In general, in different frames, sampling is performed at positions at which the same brightness change occurs, and which are slightly shifted from each other, in the embodiment, shifted by approximately half a pixel from each other. This state is called, for example, "different-phase sampling". In contrast, when the same brightness change occurs at the same position or at positions shifted by just one pixel in different frames, this is called, for example, "same-phase sampling".

Figure 14:
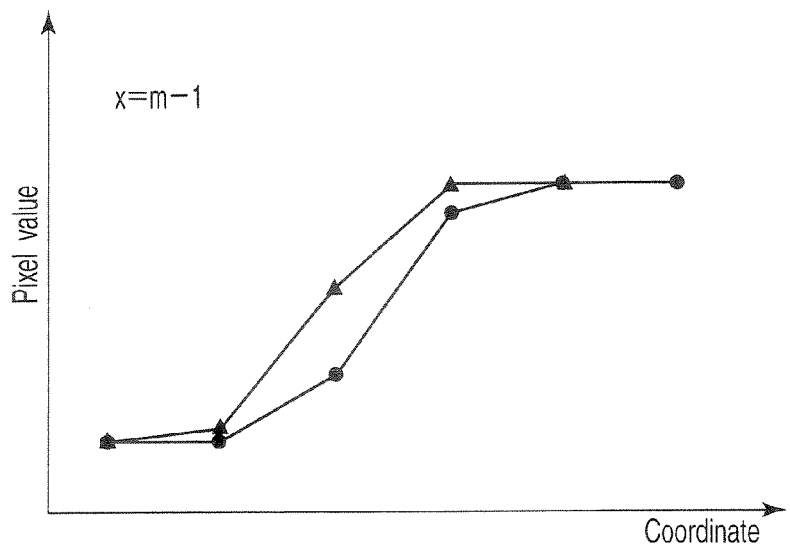
FIG. 14 is a graph illustrating a state in which the error is acquired by shifting the coordinate of the target block of FIG. 13 by one pixel with respect to the reference frame of FIG. 11.
Figure 15:
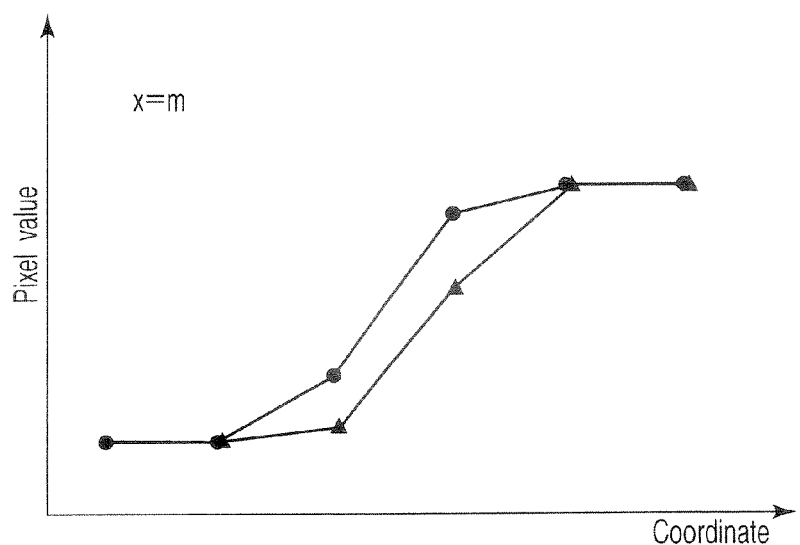
FIG. 15 is a graph illustrating a state in which the error is minimum as a result of such a shift as shown in FIG. 14.
Figure 16:
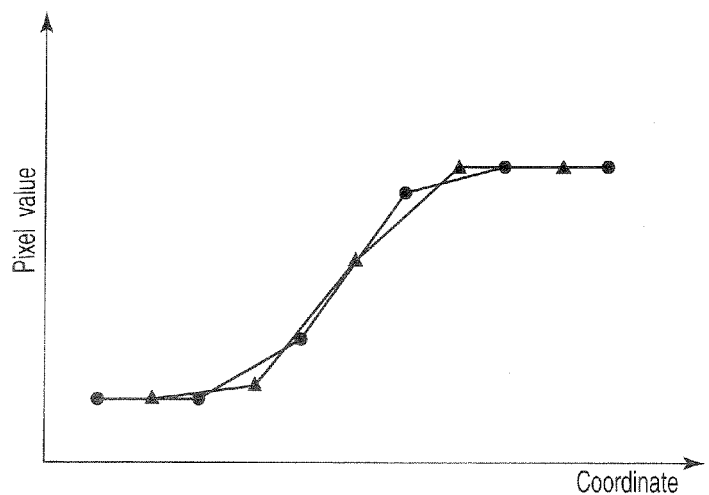
FIG. 16 is a graph illustrating a state in which the error is less than the case of FIG. 15.

The corresponding pixel points acquired at steps S202 and S203 are acquired by computing the errors between the reference frame of FIG. 11 and the target block of FIG. 13, while shifting pairs of position coordinates in the target block one by one with respect to the reference frame. FIGS. 14 and 15 show this process. For simplifying the description, assume that the block has five pixels (5×1), and a search is performed only in the x-direction. Assume that FIG. 15 shows the case where the matching error is minimum (x=m). On the other hand, FIG. 14 shows the case where x is set to (m−1). "x=m" indicates corresponding pixel points. To make the change patterns of the target block and reference frame coincide more accurately, the position that provides the state of FIG. 16, in which the phase is shifted by half a pixel, should be detected. Parabola fitting is a method for estimating sub-pixel points (see, for example, Masao Shimizu and Masatoshi Okutomi "Significance and Attributes of Sub-Pixel Estimation on Area-Based Matching"). Parabola fitting will be described later with reference to FIG. 25. Note that as shown in FIG. 9, block 913 is determined by sub-pixel estimation, and the center of block 913 is corresponding point 914. Based on this information, the pixel value of the target pixel corresponding to point 914 is arranged as the sample value of corresponding point 916 in image space 908 acquired by expanding image space 906.

Figure 17:
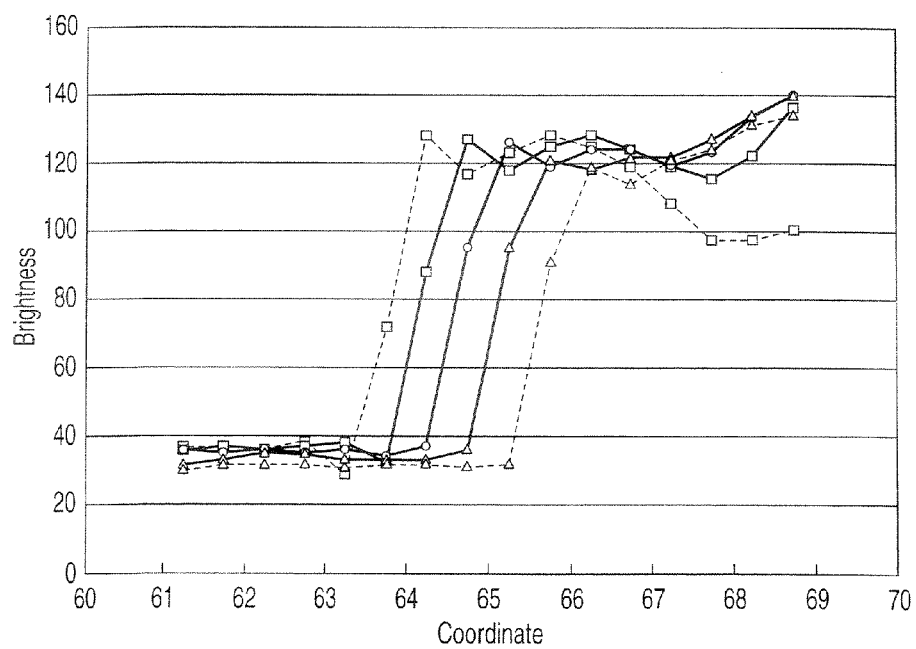
FIG. 17 is a view illustrating the relationship between the brightness and coordinate of certain photography data.

For realizing high resolution, a large number of pixel values are needed, which are sampled, by different-phase sampling, from the portions of different frames that show the same brightness change as indicated by the broken lines in FIGS. 10 and 12. Therefore, it is advantageous to detect the same portion (which has the same brightness change) of the same subject in different frames, and to make the detected positions correspond to each other. However, there may be another portion of the subject that provides the same brightness change. High-resolution image data corresponding to an actual photograph is shown in FIG. 17. In FIG. 17, the horizontal axis indicates the x-directional coordinates of pixels, and the vertical axis indicates the brightness. Five data items in the x-direction are expressed by different curves. It can be understood from this figure that it is possible that even different portions in the x-direction provide very similar brightness changes. Concerning this property, it is said that local patterns have autocorrelation. A method for utilizing autocorrelation in local pattern will be described in a second embodiment.

In general, a spatial change in brightness, which is caused by an edge included in an image, continues over several hundreds of pixels if the edge is long, and continues over several pixels even if it is short. The pixel values acquired by sampling the edge pixels can be utilized as the sample values of another edge included in the image and located near the first-mentioned edge, for realizing high resolution. For the same reason, when a point in a reference frame corresponding to a target pixel in the reference frame is determined, the target pixel can be also utilized for reproducing a brightness change near the target pixel. In light of this, in the embodiment, a plurality of corresponding points located at different positions are determined for one target pixel. Further, in the embodiment, not only a corresponding point, at which a minimum error (matching error) is detected, but also positions, at which second and third minimum matching errors are detected, are set as corresponding error points. Based on the corresponding error points, sub-pixel estimation is performed. A more specific operation will be described later with reference to FIGS. 32 to 39.

Referring again to FIG. 9, another corresponding point 917 acquired as described above is expressed by corresponding vector 918, and sample value 919 is arranged accordingly. Block 920 is the block detected when corresponding point 917 is detected, and has a pixel pattern very similar to that of block 913.

Figure 18:
FIG. 18 is a view illustrating a target block extracted from the frame of FIG. 9.
Figure 19:
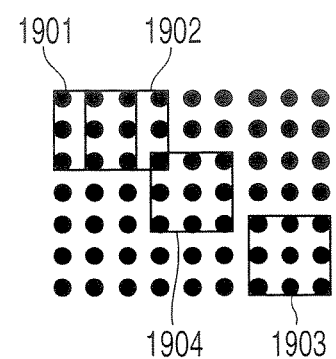

Referring to FIGS. 18 and 19, a description will be given of a method for searching reference frame 903 for a portion having a pixel-value change pattern similar to that of the extracted target block.

Firstly, the target block will be described more specifically. FIG. 18 shows a target block of (3×3) pixels extracted from frame 901, and FIG. 19 shows search ranges in reference frame 903. The search ranges are, for example, rectangular or square portions of a preset size, using the position corresponding to target pixel 911 as the center. The matching error computation unit 103 computes the error between the target block of (3×3) and each search range of (3×3). This error (matching error) is a sum of absolute difference acquired by summing the absolute values of the differences between 9 pixels in the target block and corresponding pixels in each search range, or the sum of squared difference acquired by summing the squares of the differences. Specifically, firstly, the error between the target block in frame 901 and the upper left search range 1901 in reference frame 903 is computed. Secondly, the error between the target block and the search range 1902 rightward adjacent to the search range 1901. After that, similar error-acquisition computation is performed, while shifting the search range in the raster order in units of pixels, until acquiring the error between the target block and the lower right search range 1903.

Referring to FIGS. 20 to 23, the vector search space indicating the search ranges will now be described.

Figure 20:
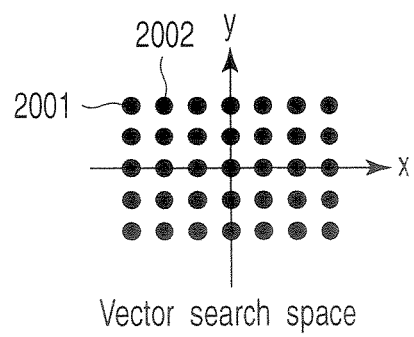
FIG. 20 is a view illustrating a vector search space indicating the search ranges of FIG. 19.
Figure 21:
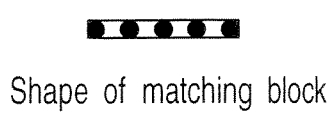
FIG. 21 is a view illustrating a modification of the target block of FIG. 18.
Figure 22:
FIG. 22 is a view illustrating another modification of the target block of FIG. 18.
Figure 23:
FIG. 23 is a view illustrating yet another modification of the target block of FIG. 18.

FIG. 20 shows the search space. In FIG. 20, the x-axis is the horizontal axis, the y-axis of the vertical axis, and the origin indicates the center of block 1904 in FIG. 19. During the search process, three search ranges of the same size as block 1904 can be set along the x-axis, and two search ranges of the same size as block 1904 can be set along the y-axis. The black dots in FIG. 20 indicate the center points of the search ranges that can be set. Position 2001 indicates search range 1901 in FIG. 19, and position 2002 indicates search range 1902. In the search space, a position at which a minimum error is set as a corresponding pixel point. At this stage, the corresponding pixel point is positioned at a certain pixel on the reference frame. The search range is not limited to a square or rectangular one. It may be such a horizontal line as shown in FIG. 21, or such a vertical line as shown in FIG. 22, or such an oblique line as shown in FIG. 23.

Figure 24:
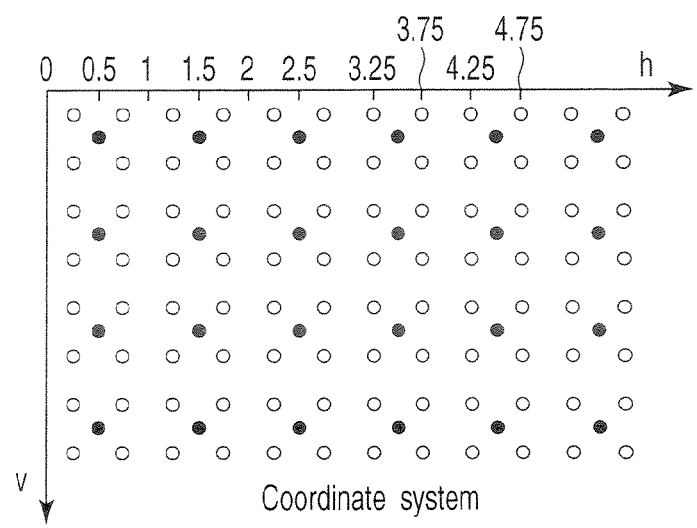
FIG. 24 is a view illustrating a coordinate system expressing an image space.

Referring to FIG. 24, the image space will be described. FIG. 24 shows a coordinate system used for the image space. In FIG. 24, assume that the upper left point of the image space is set as the origin, h is the horizontal axis, and v is the vertical axis. The sample pixel points (h, v) of a low-resolution image expressed by the black dots are given by $(h, v)=(0.5, 0.5), (1.5, 0.5), (2.5, 0.5), \ldots, (0.5, 1.5), \ldots$ Namely, h is the position represented by (*0.5) (*=0, 1, 2, 3, ... ), and v is the position also represented by (*0.5) (*=0, 1, 2, 3, ... ). In contrast, the sample pixel points (h, v) of a high-resolution image expressed by the white dots are given by $(h, v)=(0.25, 0.25), (0.75, 0.25), \ldots, (0.25, 0.75), \ldots$ Namely, h and v are the positions represented by (*0.25) or (*0.75).

Referring to FIG. 25, parabola fitting will be described.

In parabola fitting shown in FIG. 25, the horizontal axis is the x-axis, and the vertical axis indicates the matching error. In this case, the minimum error at an x-directional position (m), and the errors acquired at the x-directional positions (m−1) and (m+1) immediately before and after m are dotted on a parabola, and the value of x, at which the parabola assumes the minimum value, is set as a corresponding point. If there is a phase displacement of half a pixel, the same error has to be acquired at x=m and x=m−1, and the minimum value be assumed at the center of these x values. However, in FIG. 25, the position that assumes the minimum value is slightly displaced from that center to realize a more general explanation of parabola fitting.

Instead of parabola fitting, equiangular fitting may be employed which is disclosed in Masao Shimizu and Masatoshi Okutomi "Significance and Attributes of Sub-Pixel Estimation on Area-Based Matching".

Figure 27:
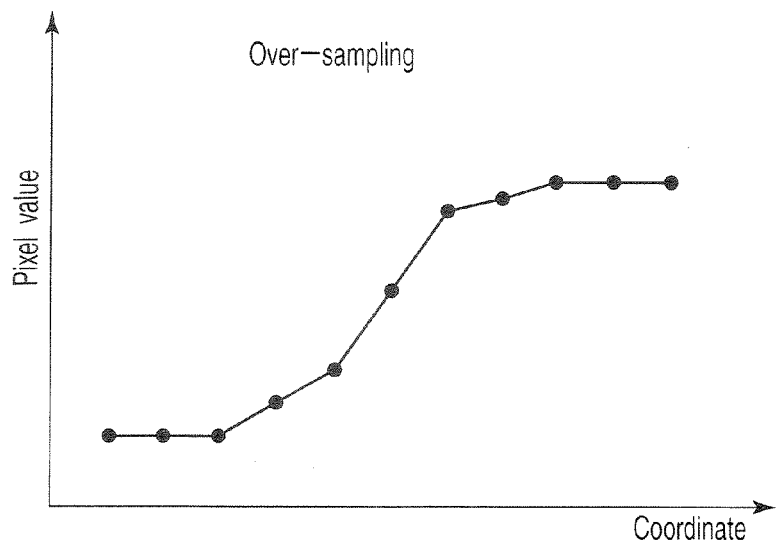
FIG. 27 is a graph corresponding to FIG. 26 and illustrating the relationship between the coordinate and pixel value assumed when the data density of the reference frame of FIG. 11 is increased.
Figure 28:
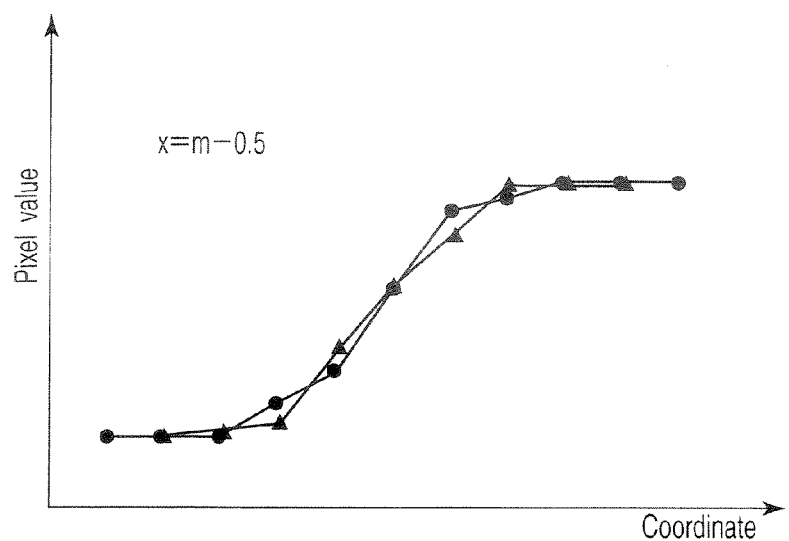
FIG. 28 is a graph corresponding to FIG. 16 and acquired based on FIGS. 26 and 27.

Further, an over-sampling method is another method for realizing sub-pixel estimation. In the over-sampling method, firstly, the data shown in FIG. 26 is prepared which is acquired by subjecting the block data of another frame shown in FIG. 13 to linear interpolation to double the data density. On the other hand, the data of the reference frame shown in FIG. 11 is also double as shown in FIG. 27. If a search is carried out in this state, even the matching error corresponding to x=m−0.5 can be computed directly without fitting, and is lower than that acquired at x=m shown in FIG. 29. As a result, x=m−0.5 is detected as the minimum-error position, i.e., a corresponding point.

Figure 31:
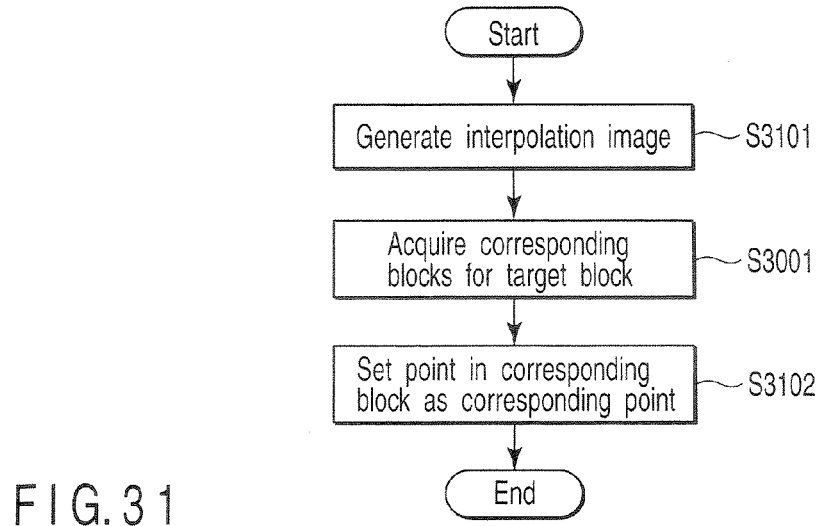
FIG. 31 is a flowchart illustrating an operation example for acquiring corresponding points using over-sampling.
Figure 32:
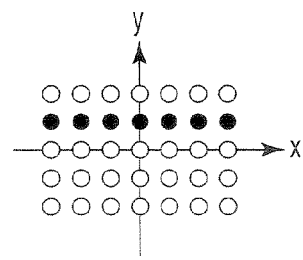
FIG. 32 is a view illustrating an example of a search range for acquiring a corresponding point, which is advantageous when the brightness varies in the horizontal direction.
Figure 33:
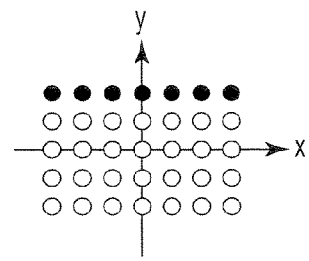
FIG. 33 is a view illustrating another example of the search range for acquiring a corresponding point, which is advantageous when the brightness varies in the horizontal direction.
Figure 34:
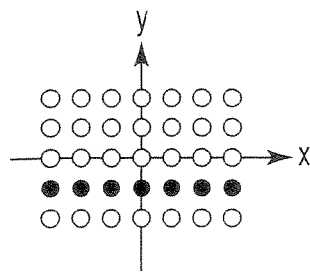
FIG. 34 is a view illustrating yet another example of the search range for acquiring a corresponding point, which is advantageous when the brightness varies in the horizontal direction.

As described above, in the over-sampling method, it is necessary to double the amount of data in order to reduce the interval of computing an error to ½, and to increase the amount of data four times in order to reduce the interval of computing an error to ¼. However, corresponding points can be acquired using simple algorithm. FIGS. 30 and 31 are flowcharts for acquiring corresponding points using a fitting method (such as parabola fitting or equiangular fitting) and over-sampling method, respectively. In FIGS. 30 and 31, the steps similar to those described above are denoted by corresponding reference numbers, and no detailed description is given thereof.

At step S3001, the error between a target block and a block in a reference frame is computed while shifting the position of the block in the reference frame in units of pixels, and the corresponding block in the reference frame, at which the error is minimum, is detected.

At step S3002, based on the detection result at step S3001, a corresponding point is detected by parabola fitting or equiangular fitting, which is the termination of the process.

At step S3101, pixel interpolation is performed on a target block and reference frame, thereby doubling their pixel density. After that, the program proceeds to step S3001 and then to step S3102.

At step S3102, a certain point existing in a corresponding block is set as a corresponding point, thereby terminating the process. For example, the center of the corresponding block is set as the corresponding point.

Referring to FIGS. 32 to 39, a description will be given of a specific method for acquiring a plurality of corresponding points at different positions.

In the search space shown in FIG. 20, the positions, at which the $2^{nd}$ and $3^{rd}$ minimum matching errors are acquired, are set as corresponding error points, as well as the position at which the minimum matching error is acquired, and sub-pixel estimation is performed using the corresponding error points. The number of corresponding points may be preset. Alternatively, all positions at which the error is not more than a preset value may be set as corresponding points. Yet alternatively, the search range may be limited to that indicated by the black dots in FIG. 32, and a first corresponding point be determined at the position within the search range at which the minimum error is acquired. Subsequently, respective corresponding points may be acquired in the search ranges shown in FIGS. 33, 34 and 35. This way of searching for corresponding points while shifting the search range in the vertical direction is especially advantageous in the case of, for example, FIG. 17 where the brightness is varied in the horizontal direction.

Figure 37:
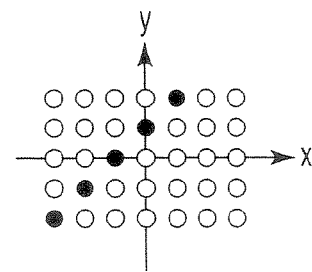
FIG. 37 is a view illustrating an example of a search range for acquiring a corresponding point, which is advantageous when the brightness varies in an oblique direction.
Figure 35:
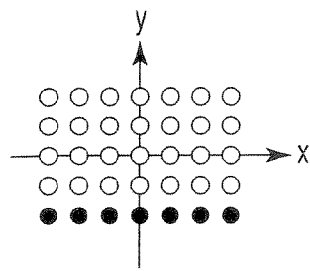
FIG. 35 is a view illustrating a further example of the search range for acquiring a corresponding point, which is advantageous when the brightness varies in the horizontal direction.

In contrast, the way of searching corresponding points while shifting the search range in the horizontal direction is especially advantageous in the case where the brightness is varied in the vertical direction. Because of this, it is advantageous for the candidate designation unit 102 to set a horizontal search range when a target edge extends vertically, and to search for corresponding points while shifting the search range vertically. On the other hand, when the target edge extends horizontally, it is advantageous for the candidate designation unit 102 to set a vertical search range and search for corresponding points while shifting the search range horizontally. Yet alternatively, such an oblique search range as shown in FIG. 37 may be set for an oblique edge. Namely, the gradient direction of the pixel values of target pixels is detected, and corresponding points are searched for based on the gradient direction.

Figure 38:
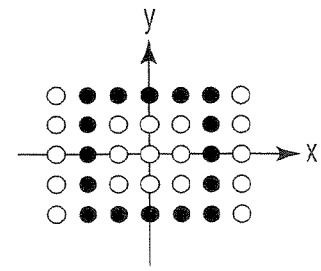
FIG. 38 is a view illustrating a case where the search range for acquiring a corresponding point is rectangular.
Figure 36:
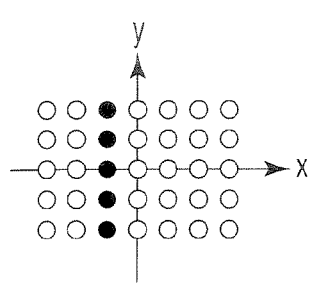
FIG. 36 is a view illustrating an example of a search range for acquiring a corresponding point, which is advantageous when the brightness varies in the vertical direction.

Alternatively, the outline of rectangular search ranges may be limited as shown in FIG. 38, and corresponding points be determined while changing the size of the search range. In any case, corresponding points are acquired by performing sub-pixel estimation based on corresponding error points.

Figure 39:
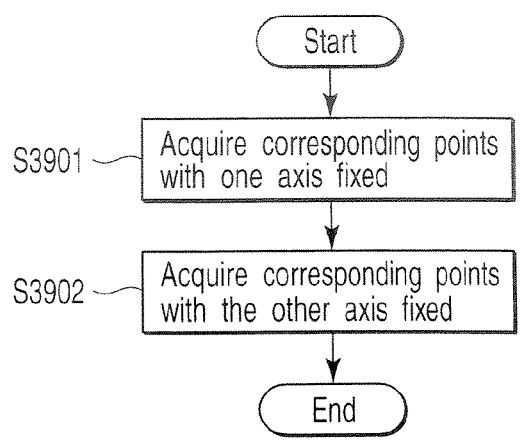
FIG. 39 is a flowchart illustrating an operation example for detecting a plurality of corresponding points.

FIG. 39 is a flowchart for detecting a plurality of corresponding points while changing the search range from one to another concerning one target pixel.

At step S3901, corresponding points are detected while fixing one of the horizontal and vertical coordinates and changing the other coordinate.

At step S3092, corresponding points are detected while switching the fixed coordinate.

Figure 40:
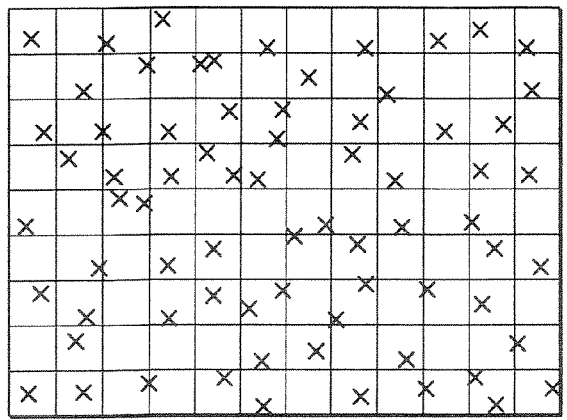
FIG. 40 is a view illustrating a plurality of corresponding points detected in an image space.

Referring to FIG. 40, a description will be given of the computation of the pixel values of a high-resolution image performed at step S205.

After step S204, such corresponding points as indicated by marks "x" in FIG. 40 are acquired. There are many methods for determining the values of pixels arranged in a matrix from the corresponding points (sample points) distributed nonuniformly. When, for example, a superposition method (such as nonuniform interpolation described in S. Park, et al. "Super-Resolution Image Reconstruction: A Technical Overview", p. 25) is used, and when the value of pixel 921 included in the high-resolution image of FIG. 9 is determined, sample values 919, 916 and 922, etc., which are located near pixel 921, are checked to detect a sample value closest to pixel 921 and use it as the value of pixel 921. Alternatively, the value of pixel 921 is determined by imparting weights to sample values such that a greater weight is imparted as the distance from pixel 921 becomes longer, and using the weighted average of the resultant sample values as the value of pixel 921. Yet alternatively, the average of the sample values falling within a preset distance range is used as the value of pixel 921.

Figure 41:
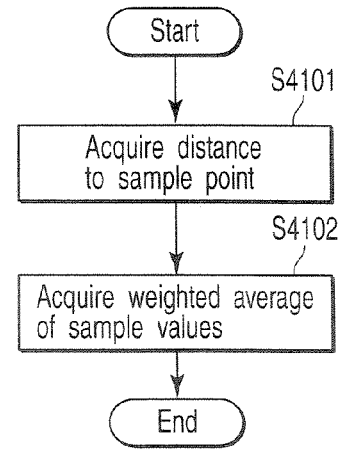
FIG. 41 is a flowchart illustrating an operation example for acquiring the pixel values of a high-resolution image by superposition.

FIG. 41 shows a flowchart for acquiring pixel values of a high-resolution image using the superposition method.

At step S4101, the distance between a target pixel and each of the sample points corresponding to the target pixel is acquired in units of pixels.

At step S4102, each pixel value is set as the weighted average of sample points. At this time, the closer the distance from each pixel, the more each sample value is weighted.

If the POCS method (see, for example, S. Park, et al. "Super-Resolution Image Reconstruction: A Technical Overview", p. 29) is used instead of the superposition method, a shaper image can be acquired although the process is complex. In the POCS method, firstly, a provisional value is imparted to each pixel of high-resolution image 908 using, for example, bilinear interpolation or third-order interpolation. After that, a sample value (hereinafter referred to as a "provisional sample value"), assumed when a provisional pixel value of the high-resolution image, is computed.

Figure 42:
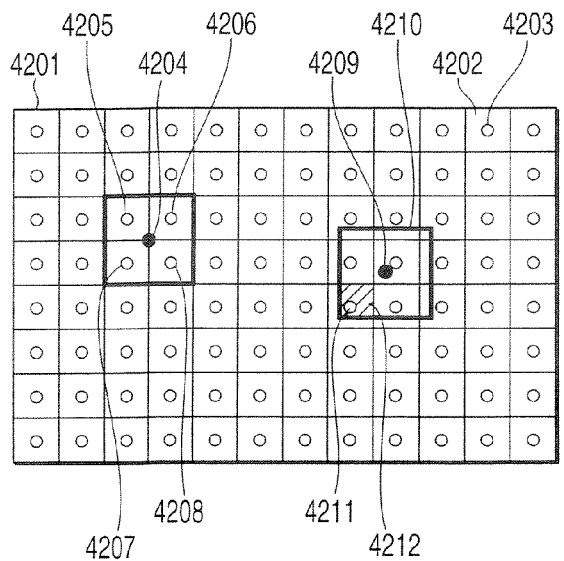
FIG. 42 is a view illustrating an image space, pixels and rectangular portion used for explaining a method for computing provisional sample values.

Referring now to FIG. 42, a method for computing the provisional sample value will be described. As described with reference to FIG. 6, image space 4201 is divided into a plurality of rectangular portions 4202. Pixel value 4203 located at the center of each rectangular portion represents the brightness distribution thereof. The size of each rectangular portion is determined from the density of pixels. If, for example, the resolution is reduced to ½, the size of each rectangular portion is doubled. In FIG. 42, white dots indicate the pixels of the high-resolution image, and block dots indicate sample points corresponding to a low-resolution image of half the resolution of the high-resolution image. When provisional pixel values are imparted to the pixels of the high-resolution image, the provisional sample value at sample point 4204 is acquired as the average of the pixel values of pixels 4205 to 4208. This is because sample point 4204 is positioned at the center of four pixels of the high-resolution image.

In contrast, in the case of sample point 4209 deviated from the center of four pixels of the high-resolution image, the weighted average of the portions, which rectangular portion 4210 represented by sample point 4209 overlaps, is used as a provisional sample value. For instance, the weight imparted to pixel 4211 corresponds to the area of hatched portion 4212. Concerning nine rectangular portions overlapping with rectangular portion 4210, weights are imparted to them in proportion to the overlapping areas, and the weighted average of the resultant nine pixel values is acquired and used as the provisional sample value. If the high-resolution image is an accurate one, the provisional sample value has to be equal to the corresponding sample value acquired from the low-resolution image.

However, in general, they are not equal to each other. Therefore, to make them equal to each other, the provisional sample value is updated. The difference between the sample value and provisional sample value is computed, and the corresponding provisional pixel value is subjected to addition/subtraction so as to eliminate the difference. Since a plurality of pixel values exist, the corresponding differences are subjected to weighting as employed for the sample values, and the pixel values are subjected to addition/subtraction to eliminate their respective differences. Concerning the currently computed sample point, their sample value and provisional sample value are equal to each other. However, during the process of updating another sample point, the same high-resolution image pixel may be updated. For instance, if pixel 921 in FIG. 9 is updated to be equal to sample value 919 after it is updated to be equal to sample value 916, it is not equal to sample value 916. Because of this, the updating process is iterated several times for each of all sample points. After the iteration, the high-resolution image approaches an accurate one. The image acquired by iterating the above process a preset number of times is output as a high-resolution image.

As described above, the POCS method is one method for setting the pixel values of a high-resolution image as provisional sample values, and solving the conditional expressions that the provisional sample values have to substantially be equal to sample values acquired from a low-resolution image acquired by actual photography, thereby acquiring the pixel values of the high-resolution image. The conditional expressions may be solved by another method such as the Iterative Back-Projection method (see, for example, S. Park, et al. "Super-Resolution Image Reconstruction: A Technical Overview", p. 31) or the MAP method (see, for example, S. Park, et al. "Super-Resolution Image Reconstruction: A Technical Overview", p. 28).

Figure 43:
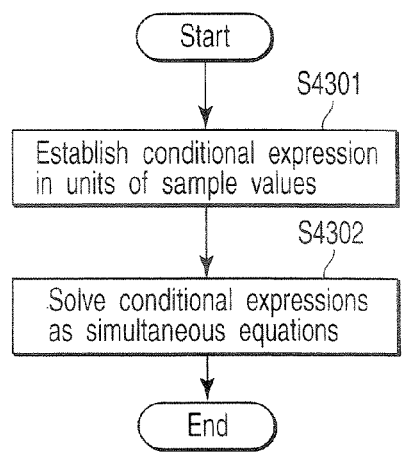
FIG. 43 is a flowchart illustrating an operation example for realizing high resolution by establishing a conditional expression in units of sample values.

FIG. 43 is a flowchart for the case of utilizing such conditional expressions as the above to realize high resolution.

At step S4301, the above-mentioned conditional expression is established in units of pixels, i.e., sample values, included in a low-resolution image.

At step S4302, a plurality of resultant conditional expressions are solved as simultaneous equations to acquire pixel value for a high-resolution image.

FIG. 44 is a flowchart for the case of reducing the amount of processing simply by performing processing around the edges of an image. The portions of the image other than the edges, i.e., the portions where there is no change in pixel value, can substantially be processed by bilinear interpolation or third-order interpolation. Accordingly, the above process using the conditional expressions can be omitted at the portions other than the edges. As a result, the amount of processing can be reduced without degrading the sharpness of the image.

At step S4401, which is performed after step S4301, edge detection is performed on a low-resolution image in units of pixels. For instance, in the case of the Sobel filter, if the difference between the values of pixels adjacent horizontally or vertically is higher than a preset value, it is determined that an edge exists, whereas if the difference is not higher than it, it is determined that no edge exists. In other words, if the pixel-value gradient is higher than a preset value, it is determined that an edge exists, whereas if the gradient is not higher than it, it is determined that no edge exists.

At step S4402, the conditional expressions corresponding to the pixels determined to be included in an edge are solved. When, for example, the POCS method is employed, only updating is carried out, which is related to the conditional expressions corresponding to the pixels determined to be included in an edge.

Referring then to FIG. 45, a description will be given of another method for processing only edge portions.

At step S4501, which is performed after step S4402, the corresponding points of only the pixels determined to be included in an edge are detected, and conditional expressions related to them are established. After that, the program proceeds to step S4402.

Instead of carrying out steps S4501 and S4402, the superposition method may be employed in which a greater weight is imparted to a sharper edge (i.e., a greater gradient in pixel value). Yet alternatively, only sample values, which are included in a local pattern including a target pixel, and have a sample-value gradient greater than a preset value, may be subjected to a weighted-average-acquiring process.

Referring to FIG. 46, step S4501 will be described in more detail.

At step S4401, edge detection is performed on a low-resolution image in units of pixels, followed by step S201. For example, a digital image of the same size as the low-resolution image, in which the pixels included in the edges are denoted by "1", and the pixels that are not included in the edges are denoted by "0", is stored as the detection result.

If it is determined at step S4601 that a target pixel is included in an edge, the program proceeds to step S202, whereas if it is not included in the edge, the program returns to step S201. In particular, when the edge detection result is stored in the form of a digital image, if the value of the target pixel is "1", the program proceeds to step S202, whereas if the value is "0", the program returns to step S201.

Figure 47:
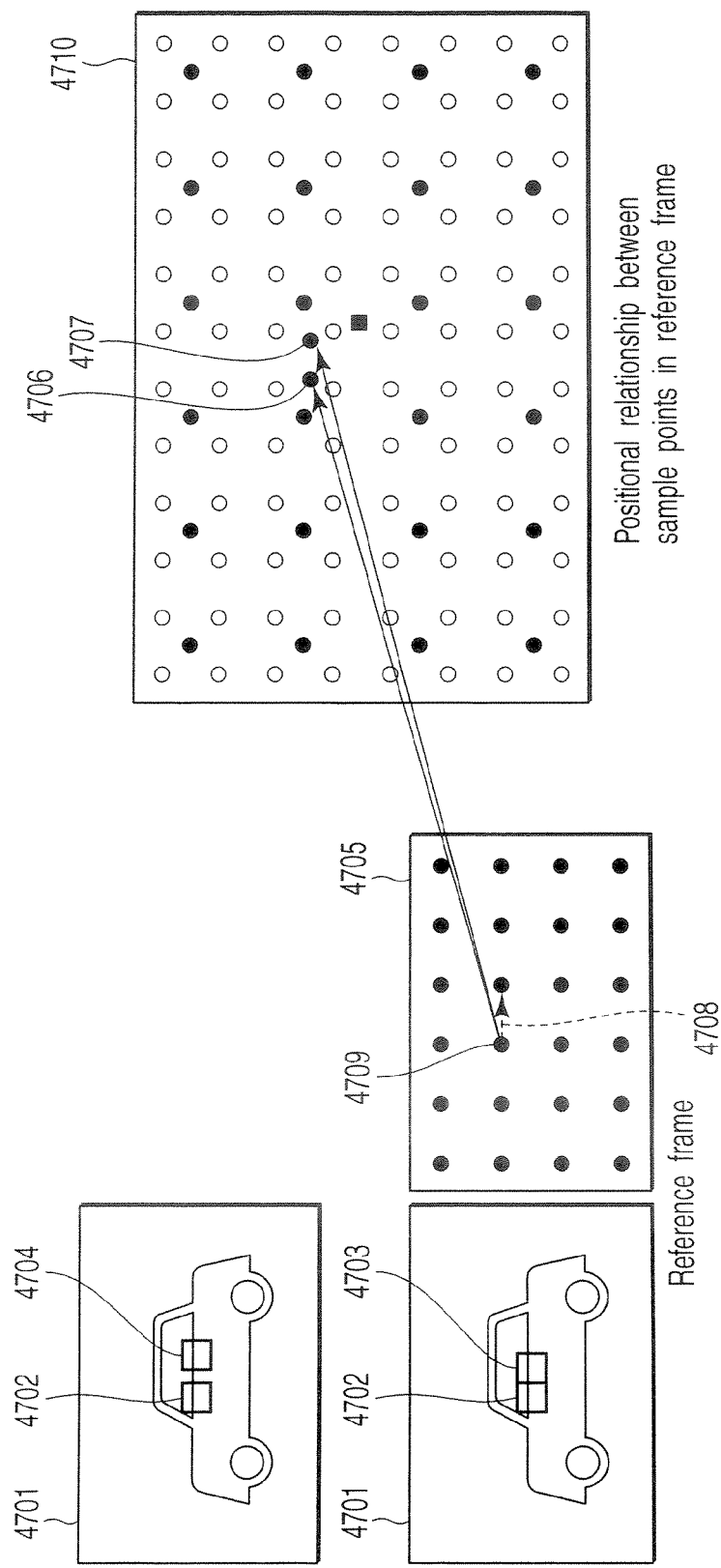
FIG. 47 is a view useful in explaining the relationship between the number of low-resolution frames and the number of corresponding points.

Referring to FIG. 47, a description will be given of the relationship between the number of low-resolution images and the number of corresponding points to be acquired for one target pixel.

The number N of low-resolution images used to acquire a single high-resolution image, and the number P of corresponding points for one target pixel are predetermined in accordance with the magnification of high resolution to be realized. For instance, in the case of magnifying both the length and width of the low-resolution images by four times, the number of pixels included in the resultant high-resolution image is 16 times that of the low-resolution images, and accordingly, 16 times sample points are required. N and P should be determined to satisfy the following:

$$NP=16$$

For instance, if the memory can store 8 (=N) low-resolution images, P is set to 2, while if it can store only 2 (=N) low-resolution images, P must be set to 8. Note that the conventional frames degradation inverse conversion method corresponds to the case where P=1 and N=16. In contrast, in the embodiment of the invention, the required memory amount can be reduced to $1/2$ (=$8/16$) or $1/8$ (=$2/16$) as mentioned above.

FIG. 47 shows the case where N=1. In FIG. 47, reference number 4701 denotes the same low-resolution frames. If target pixel 4709 is selected in image space 4705, a plurality of portions that provide minimum matching errors with respect to block 4702 around the target pixel are detected in frame 4701, thereby performing sub-pixel estimation. As a result, blocks 4703 and 4704 are detected. In this case, it is a matter of course that block 4702 itself provides a matching error of zero, i.e., the minimum error, with respect to block 4702. Therefore, this block may be eliminated from the search range, or the block that provides the second or third minimum error may be selected as a corresponding point. Corresponding vector 4708 for block 4704 is shown in FIG. 47. Both the start and end points of corresponding vector 4708 exist in the same frame. The vector corresponding to block 4703 is not shown in FIG. 47. As a result, the value of pixel 4709 is arranged as sample values 4706 and 4707 in image space 4710.

Figure 48:
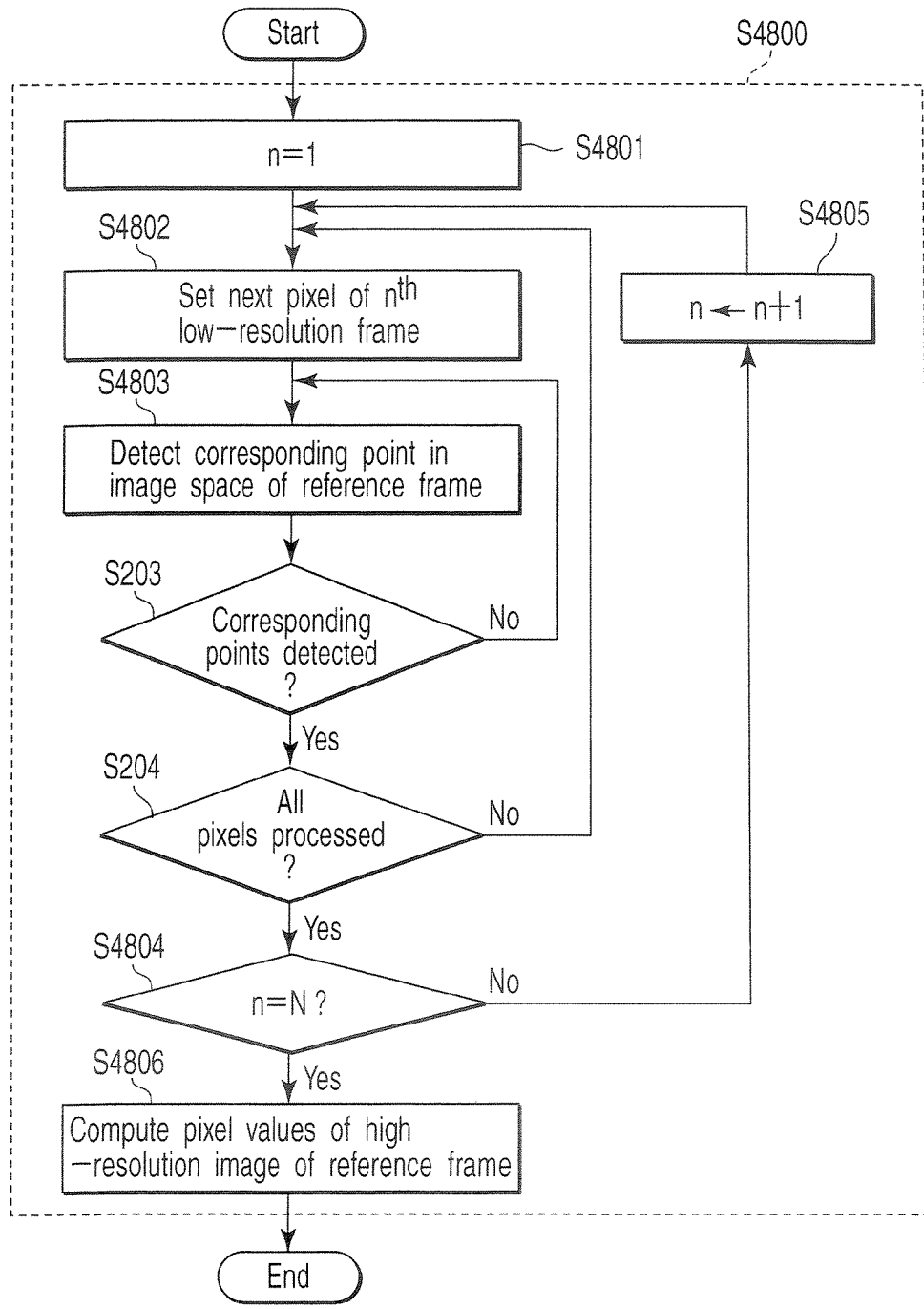
FIG. 48 is a flowchart illustrating an operation example for realizing a high resolution moving image.

FIG. 48 is a flowchart useful in explaining the case of, in particular, a moving image.

At step S4801, the number n assigned to a low-resolution frame is set to 1.

At step S4802, one pixel included in the $n^{th}$ frame is set as a target pixel.

At step S4803, a point corresponding to the target pixel is detected in the image space of a reference frame.

At step S4804, it is determined whether the number N of low-resolution images used is equal to n. If the answer is No, the program proceeds to step S4805, whereas if the answer is Yes, the program proceeds to step S4806.

At step S4805, n is incremented, and the program returns to step S4802.

At step S4806, the pixel values of a high-resolution image corresponding to the reference frame are computed, using the pixel values of the low-resolution image and the detected corresponding points, which is the termination of the process.

FIG. 49 is a flowchart for realizing high resolution, successively using moving image frames as reference frames.

At step S4901, a first frame is set as a reference frame.

At step S4902, a high-resolution image corresponding to the set reference frame is generated by the process at step S4800 in FIG. 48;

At step S4903, it is determined whether high-resolution images corresponding to all reference frames have been generated. If the answer is No, the program proceeds to step S4904, whereas if the answer is Yes, the program is finished.

At step S4904, the next frame is set as a reference frame, and the program proceeds to step S4902.

Second Embodiment

Referring to FIGS. 50 to 58, a description will be given of a second embodiment in which local pattern autocorrelation is utilized.

Figure 50:
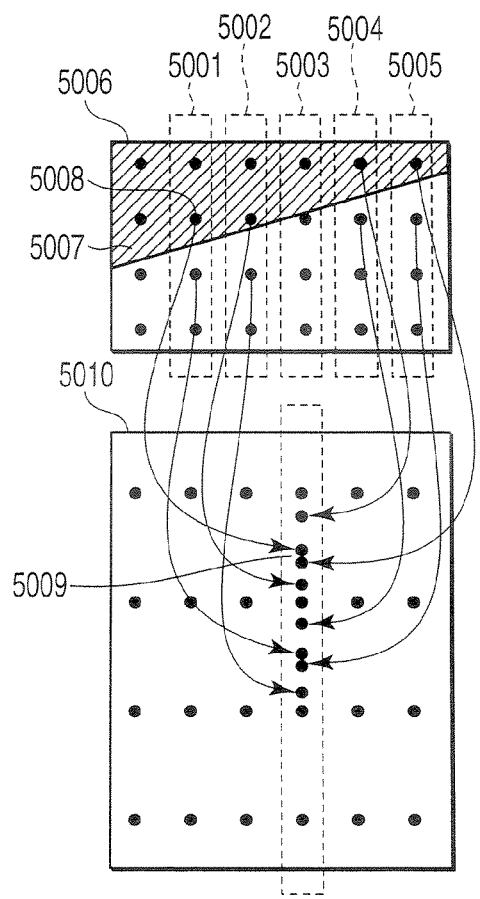
FIG. 50 is a view illustrating an image used to describe a second embodiment of the invention.
Figure 51:
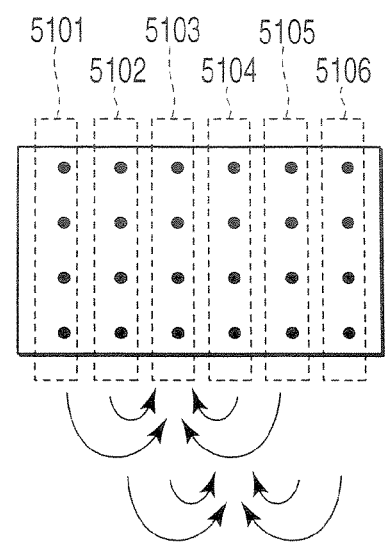
FIG. 51 is a view pixel lines for realizing a high-resolution image.

FIG. 50 shows part of a still image or part of one frame of a moving image, which is input as low-resolution image 5006 for realizing high resolution. Black dots denote pixels. The hatched portion indicates a low-brightness portion, which contains edge 5007 extending from the lower left to the upper right. The edge indicates the boundary in brightness acquired before sampling and during photography. It is a matter of course that the pixels of low-resolution image 5006 exhibit only brightness. To reproduce the light and shade of edge 5007 as accurately as possible, samples values of a certain portion of a subject are acquired from different image frames of the subject in the conventional art. However, as described above referring to FIG. 17, five lines 5001 to 5005 enclosed by the broken lines in FIG. 50 should have very similar brightness changes. Namely, the pixel values acquired by different-phase sampling can be used as sample values for realizing high resolution.

Figure 52A:
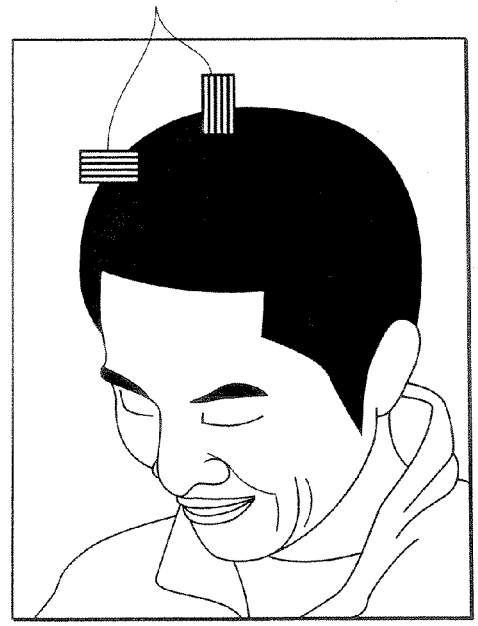
FIG. 52A is a view useful in explaining auto-congruence of an image.
Figure 52B:
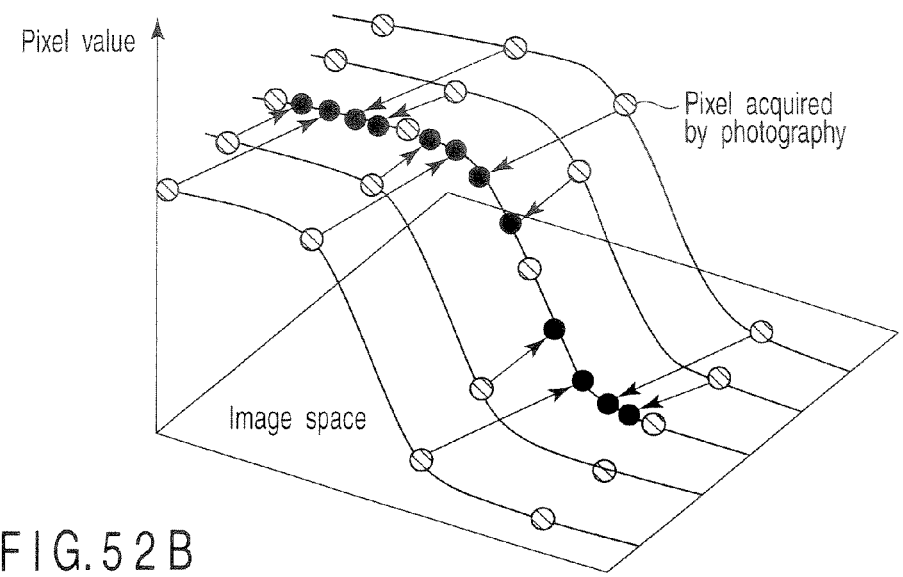
FIG. 52B is a view useful in explaining how to realize high resolution of an image portion having auto-congruence.

In light of the above, in the second embodiment, image 5006 is divided into a plurality of lines, the lines are used as a reference line one by one, and high resolution is realized for each reference line using low-resolution pixel lines near it. Further, each pixel line is used for realizing high resolution of other lines. For instance, in FIG. 51, pixel line 5102 is used at least for realizing high resolution of pixel lines 5103 and 5104. FIG. 52A shows a specific example of autocorrelation, more specifically, an image example that has an auto-congruence portion. FIG. 52B is a view useful in explaining realization of high resolution of the image portion having auto-congruence and shown in FIG. 52A.

Figure 53:
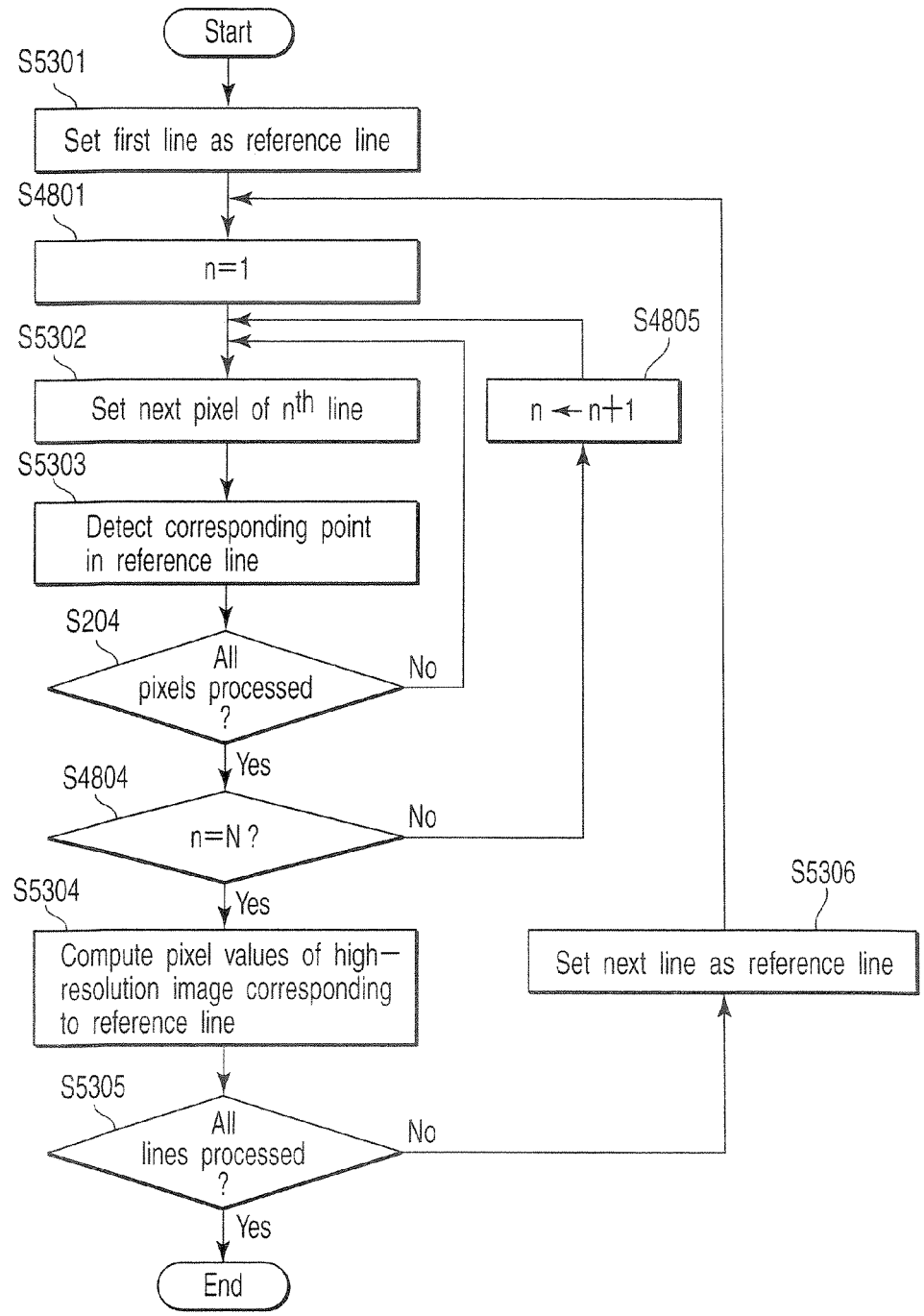
FIG. 53 is a flowchart illustrating an operation example for realizing high resolution using low-resolution pixel lines.

Referring to FIGS. 50 and 53, a description will be given of the operation of realizing high resolution using low-resolution pixel lines.

At step S5301, an end line included in the lines of the image space is set as a reference line subjected to first realization of high resolution.

At step S4801, the number n assigned to a low-resolution pixel line used for realizing high resolution of the set reference line is set to 1. In FIG. 50, line 5003 is used as a reference line, and pixel lines 5001 to 5005 are used for realizing high resolution of the reference line. Firstly, pixel line 5001, for example, is selected.

At step S5302, one pixel included in the $n^{th}$ line is set as a target pixel. In FIG. 50, assume that pixel 5008 is set as the target pixel.

At step S5303, the point corresponding to the target pixel is detected in the image space of the reference line, and then the program proceeds to step S204. In FIG. 50, point 5009 is detected as the corresponding point for target pixel 5008. In FIG. 50, image space 5010, which is identical to image space 5006, is prepared for easy viewing.

At step S204, it is determined whether corresponding points have been detected concerning all pixels included in the $n^{th}$ line. If the answer is No, the program proceeds to step S4805, whereas if the answer is Yes, the program proceeds to step S5304.

At step S4805, n is incremented, and the program proceeds to step S5304. FIG. 50 shows only the corresponding points detected in reference line 5003, based on the pixels located near the edge and included in pixels lines 5001, 5002, 5004 and 5005.

At step S5304, the pixel values of the high-resolution image corresponding to the reference line are computed using the pixel values of the low-resolution pixel lines and the detected corresponding points, and then the program proceeds to step S5305.

At step S5305, it is determined whether all lines to be subjected to high resolution have been processed. If the answer is No, the program proceeds to step S5306, whereas if the answer is Yes, the program is finished.

At step S5306, the next line is set as a reference line, and the program proceeds to step S4801.

Figure 54:
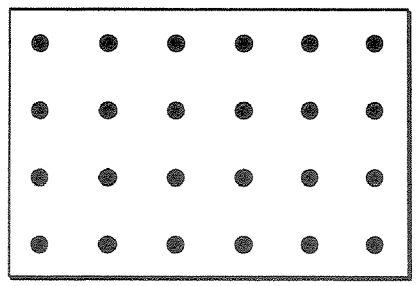
FIG. 54 is a view illustrating a low-resolution image.
Figure 55:
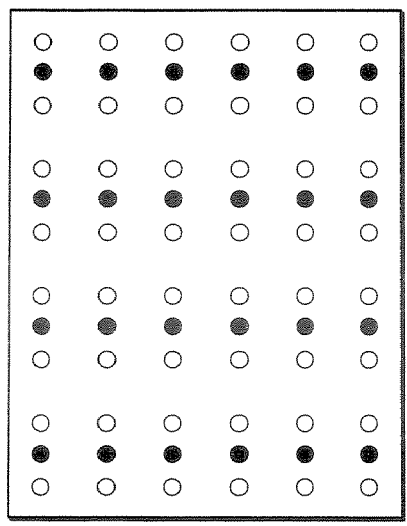
FIG. 55 is a view acquired by doubling the resolution of the image of FIG. 54 in the vertical direction.
Figure 56:
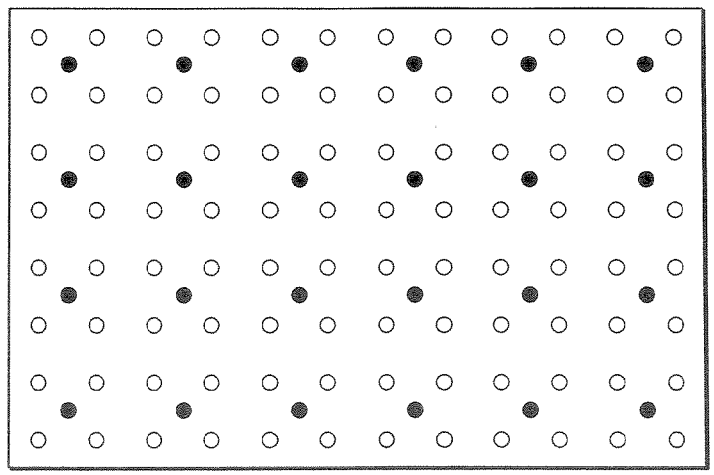
FIG. 56 is a view acquired by doubling the resolution of the image of FIG. 54 in both the horizontal and vertical directions.
Figure 57:
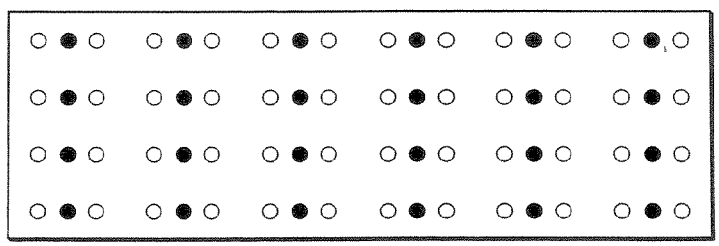
FIG. 57 is a view acquired by doubling the resolution of the image of FIG. 54 in the horizontal direction.

In the flowchart of FIG. 53, the resolution of the image is enhanced in the direction of each pixel line. Specifically, in FIG. 50, processing for high resolution is performed vertically. For instance, in the case where the input low-resolution image is such an image of (6×4) pixels as shown in FIG. 54, if the resolution of the image is doubled using the vertical line, such an image of (6×8) pixels as indicated by the white dots in FIG. 55 is generated. Further, if the resolution of the resultant image is doubled using the horizontal line, such an image of (12×8) pixels as indicated by the white dots in FIG. 56 is generated. As a result, an image twice as large as the image shown in FIG. 54 is acquired. On the other hand, if the resolution of the image is doubled firstly using the horizontal line, such an image of (12×4) pixels as shown in FIG. 57 is generated. After that, if the resolution of the resultant image is doubled using the vertical line, such an image of (12×8) pixels as shown in FIG. 56 is generated. Thus, same high resolution can be realized regardless of the order of high-resolution realization direction.

Figure 58:
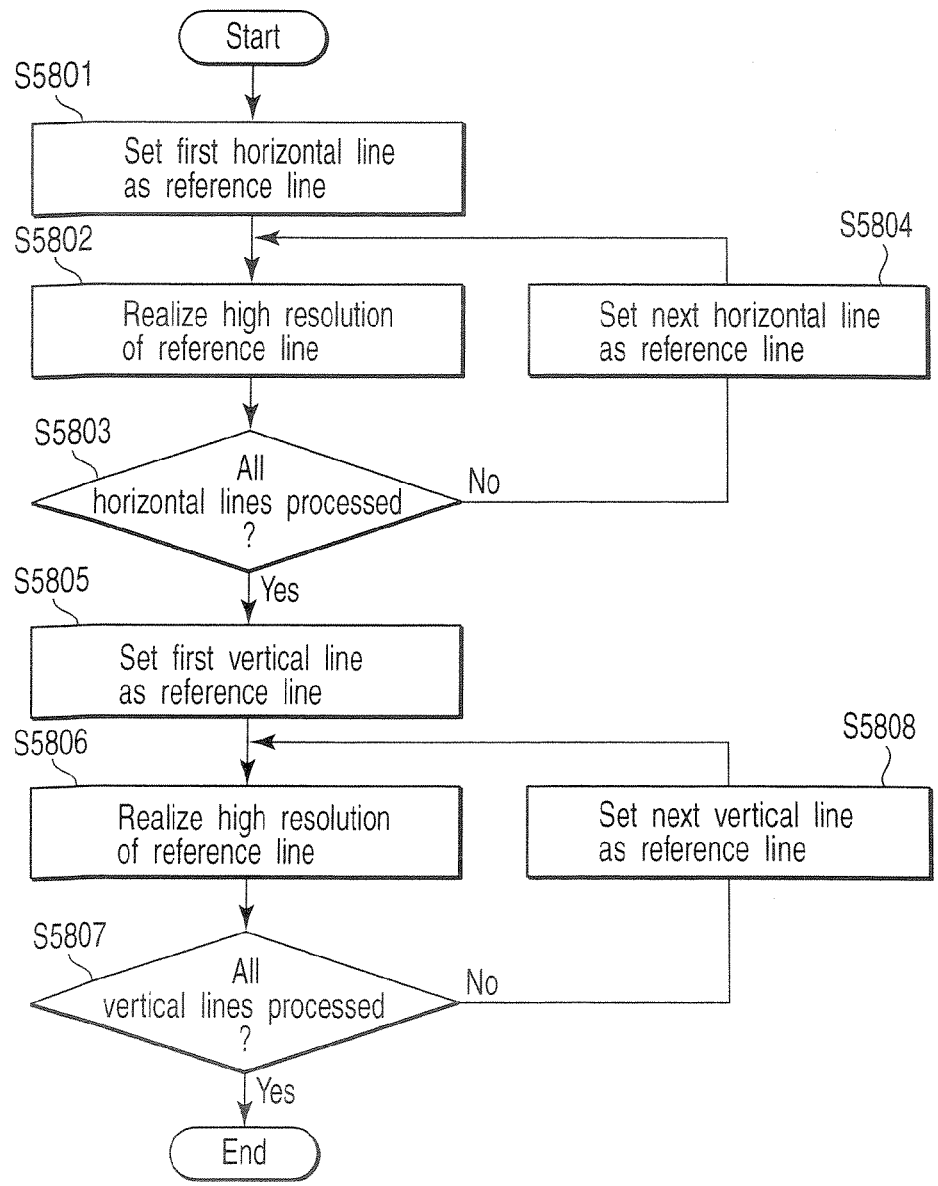
FIG. 58 is a flowchart illustrating an operation example for acquiring the high-resolution image of FIG. 56.

Referring to the flowchart of FIG. 58, a description will be given of the process of realizing high resolution firstly in the horizontal direction and then in the vertical direction.

At step S5801, an end horizontal line included in the horizontal lines, into which the image space is divided, is set as a reference line subjected to first realization of high resolution. Subsequently, the program proceeds to step S5802.

At step S5802, high resolution of the reference line is realized by the procedure indicated by steps S4801 to S5304 shown in FIG. 53. After that, the program proceeds to step S5803.

At step S5803, it is determined whether all horizontal lines to be subjected to high resolution have been processed. If the answer is No, the program proceeds to step S5804, whereas if the answer is Yes, the program proceeds to step S5805.

At step S5804, the next horizontal line is set as a reference line, and the program proceeds to step S5802.

At step S5805, an end vertical line included in the vertical lines, into which the image space is divided, is set as a reference line subjected to first realization of high resolution. Subsequently, the program proceeds to step S5806.

At step S5806, high resolution of the reference line is realized by the procedure indicated by steps S4801 to S5304 shown in FIG. 53. After that, the program proceeds to step S5807.

At step S5807, it is determined whether all vertical lines to be subjected to high resolution have been processed. If the answer is No, the program proceeds to step S5808, whereas if the answer is Yes, the program is finished.

At step S5808, the next vertical line is set as a reference line, and the program proceeds to step S5806.

Third Embodiment

Figure 59:
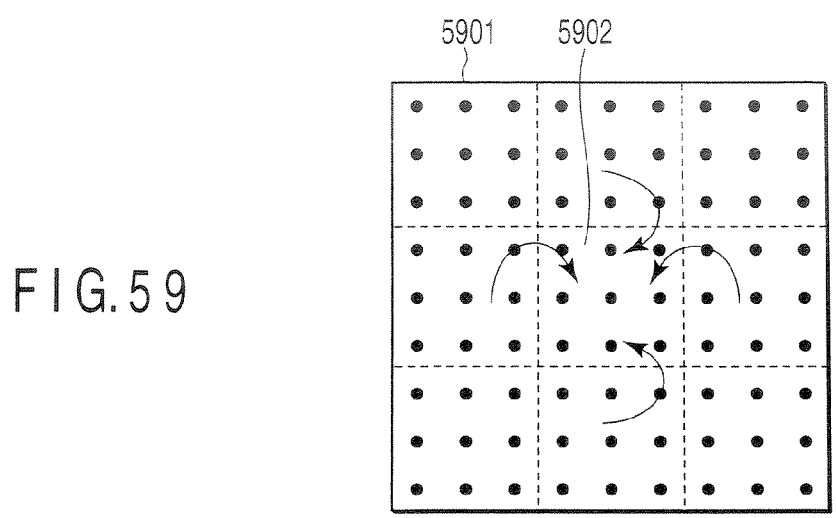
FIG. 59 is a view illustrating an image used to describe a third embodiment.
Figure 60:
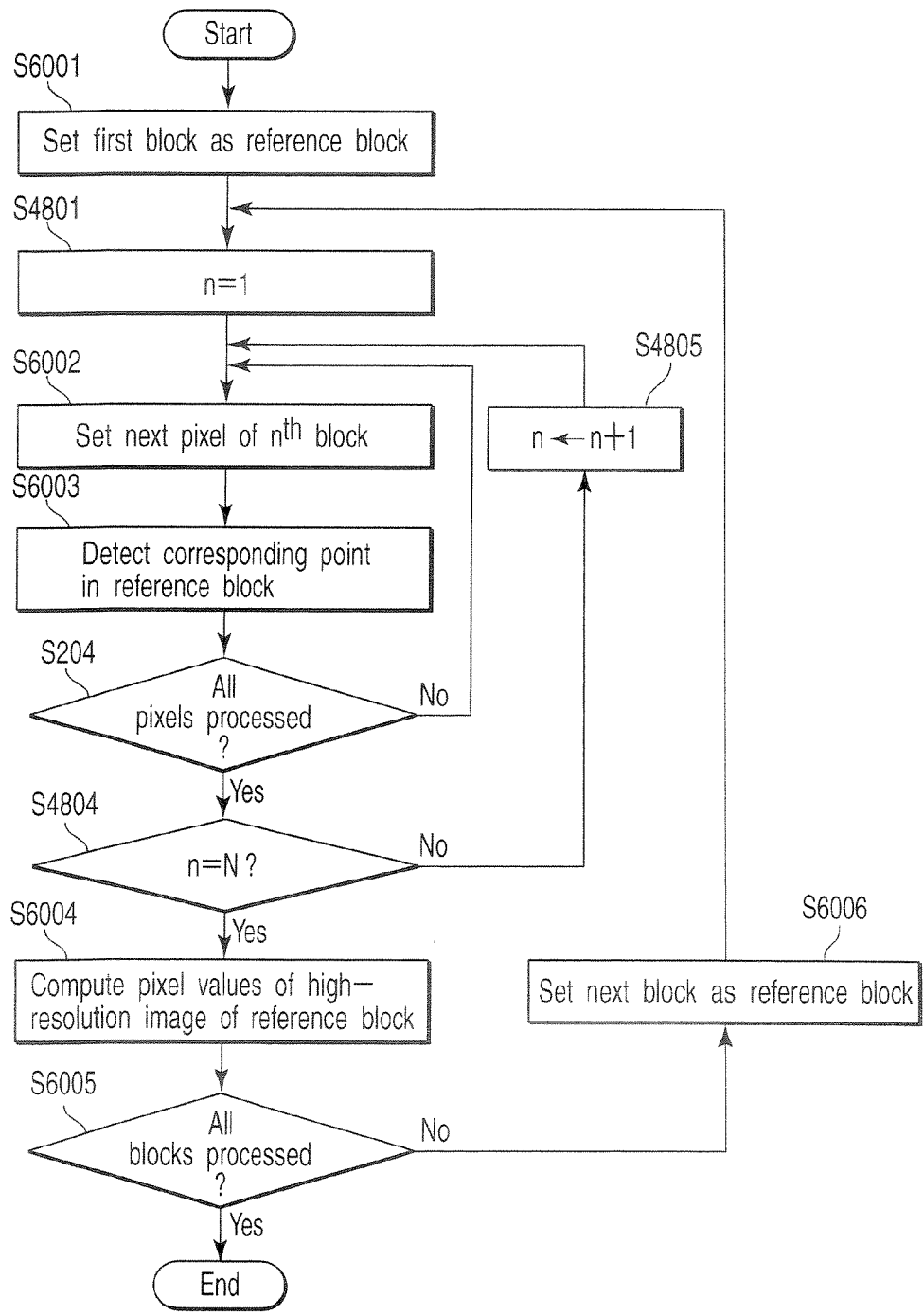
FIG. 60 is a flowchart illustrating an operation example for realizing high resolution by dividing an image into blocks.

Referring to FIGS. 59 and 60, a description will be given of a third embodiment in which when local pattern autocorrelation is utilized, blocks are used instead of lines.

As shown in FIG. 59, an image of (9×9) pixels is divided into blocks 5901 of (3×3) pixels, and one of the blocks 5901 is used as reference block 5902 in which points (corresponding points) corresponding to the pixels of the other blocks are determined.

Referring to the flowchart of FIG. 60, the operation of the third embodiment will be described.

At step S6001, an end block included in the blocks, into which the image space is divided, is set as a reference block subjected to first realization of high resolution. Then, the program proceeds to step S4801.

At step S4801, the number n assigned to a low-resolution block used for realizing high resolution of the set reference block is set to 1. Subsequently, the program proceeds to step S6002. In FIG. 59, block 5902 is set as the reference block, and the eight blocks adjacent to reference block 5902 are used for realizing high resolution of reference block 5902.

At step S6002, one pixel included in the $n^{th}$ block is set as a target pixel, and the program proceeds to step S6003.

At step S6003, a point corresponding to the target point is detected in the image space of the reference block, and the program proceeds to step S204.

At step S204, it is determined whether corresponding points have been detected concerning all pixels included in the $n^{th}$ block. If the answer is No, the program returns to step S6002, whereas if the answer is Yes, the program proceeds to step S4804.

At step S4804, it is determined whether the number N of low-resolution blocks used is equal to n. If the answer is No, the program proceeds to step S4805, whereas if the answer is Yes, the program proceeds to step S6004.

At step S4805, n is incremented, and the program returns to step S6002.

At step S6004, the pixel values of a high-resolution image corresponding to the reference block are computed, using the pixel values of the low-resolution image and the detected corresponding points. After that, the program proceeds to step S6005.

At step S6005, the next block is set as a reference block, and the program proceeds to step S4801.

Figure 61:
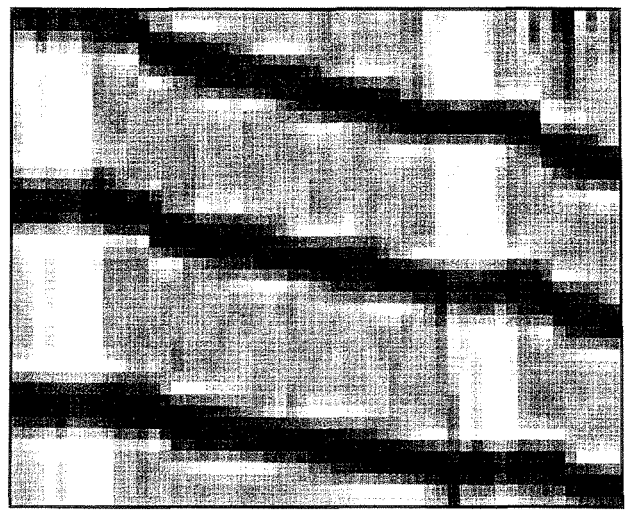
FIG. 61 is a view illustrating a high-resolution image acquired by a conventional method.
Figure 62:
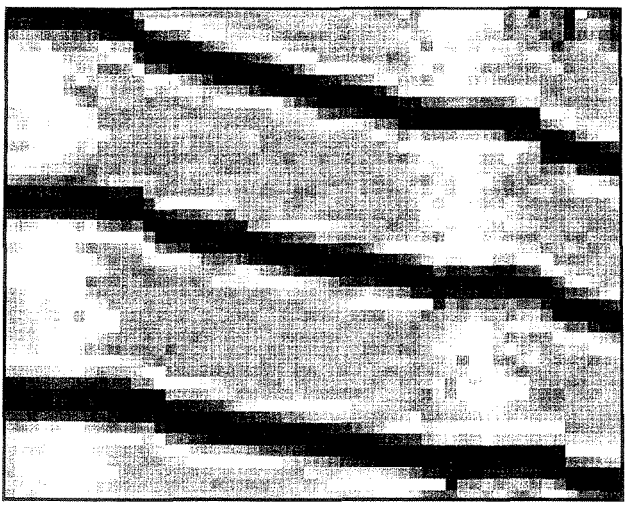
FIG. 62 is a view illustrating a high-resolution image acquired by the method employed in the embodiments.
Figure 63:
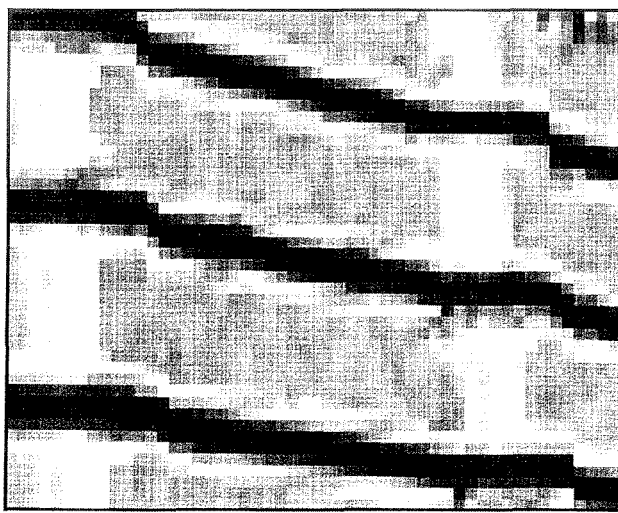
FIG. 63 is a view illustrating a high-resolution image acquired by subjecting only edges to the process of realizing high resolution.

Lastly, an example that exhibits an effect will be described. FIG. 61 shows an image acquired by subjecting a still image to a process for realizing high resolution using conventional third-order interpolation. Specifically, the shown image is acquired by enlarging black line portions of a large density-varied image, and each small square portion corresponds to one pixel. FIG. 62 shows an image acquired by enhancing the resolution of the image of FIG. 61. It is evident that the black line portions in FIG. 62 are apparently sharper than those in FIG. 61. Further, FIG. 63 shows the result of the embodiment in which only edge portions are processed. It is evident that the image of FIG. 63 is sharper than that of FIG. 61, although the number of processes required to acquire the image of FIG. 63 is smaller than that required to acquire the image of FIG. 62.

In the above-described embodiments, one pixel value in a low-resolution image can be used as a plurality of corresponding point values, i.e., sample point values. This means that the embodiments can provide a sharper high-resolution image, using a smaller number of low-resolution images, than in the conventional art. Accordingly, the required memory capacity can be reduced.

Further, in particular, when processing is performed in one frame, the range for searching corresponding points can be narrowed, thereby reducing the number of required processes. Specifically, when corresponding points are acquired between frames, ten to several tens of search ranges are generally needed since the corresponding points are moved between the frames. In contrast, when processing is performed in one frame, since corresponding points are detected in adjacent lines of one frame, it is sufficient if only several search ranges are prepared. Furthermore, although the method using a plurality of frames is not applicable to a still image, the method using a single frame is also applicable to a still image such as a photograph.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A high-resolution enabling apparatus comprising:
an acquisition unit configured to acquire, from an image source, an image represented by pixel values indicating brightness levels;
a first setting unit configured to set, as a reference frame, one frame included in the image;
a second setting unit configured to sequentially set, to be a plurality of target pixels, a plurality of pixels included in one or more frames included in the image, respectively;
a third setting unit configured to set a plurality of target image regions including the target pixels, respectively;
a searching unit configured to search the reference frame for a plurality of similar target image regions similar to each of the target image regions in a change pattern of pixel values;
a selection unit configured to select, from the similar target image regions of the reference frame, a plurality of corresponding points corresponding to each of the target pixels;
a fourth setting unit configured to set a plurality of sample values concerning brightness at the corresponding points to a pixel value of a target pixel corresponding to the corresponding points; and
a computation unit configured to compute a plurality of pixel values included in a high resolution image corresponding to the reference frame, based on the sample values and the corresponding points, the high resolution image containing a larger number of pixels than pixels contained in the reference frame.

2. The apparatus according to claim 1, wherein:
the acquisition unit is configured to acquire, as the image, a moving image formed of a plurality of frames;
the first setting unit is configured to set one of the frames as the reference frame; and
the second setting unit is configured to set, to be the target pixels, the pixels included in one or more frames of the frames except for the reference frame.

3. The apparatus according to claim 1, wherein:
the acquisition unit is configured to acquire, as the image, a moving image formed of a plurality of frames;
the first setting unit is configured to set one of the frames as the reference frame; and the second setting unit is configured to set, to be a plurality of target pixels, the pixels included in the reference frame.

4. The apparatus according to claim 1, wherein:
the acquisition unit is configured to acquire, as the image, a still image formed of one frame;
the first setting unit is configured to set the still image as the reference frame; and
the second setting unit is configured to set, to be a plurality of target pixels, the pixels included in the reference frame.

5. The apparatus according to claim 1, wherein:
the third setting unit is configured to set, as each of the target image regions, m×n (m and n are integers not less than 1) pixels located around the a target pixel of the target pixels;
the searching unit includes: a setting module configured to set a plurality of corresponding candidate image regions of m×n pixels in the reference frame; a detecting module configured to detect a corresponding pixel region in the corresponding candidate image regions, the corresponding pixel region having a minimum error sum in pixel value between the corresponding pixel region and the target image region and corresponding to the similar target image regions; a fitting module configured to fit, on a curve, the minimum error sum acquired from a region which is acquired when the corresponding pixel region is shifted by several pixels in a first direction, and another error sum acquired from another region which is acquired when the corresponding pixel region is shifted by several pixels in a second direction opposite to the first direction; and
the selection unit is configured to set, as one of the corresponding points, a position at which the curve indicates a minimum value.

6. The apparatus according to claim 1, wherein the searching includes: a generating module configured to generate an interpolation image by interpolating a plurality of other pixels between a plurality of pixels included in the image; a first setting module configured to set, as each of the target image regions, a region of m×n pixels located around a target pixel in the interpolation image; a second setting module configured to set a plurality of corresponding candidate image regions each including m×n pixels to a reference frame included in the interpolation image; a detecting module configured to detect a corresponding pixel region from the corresponding candidate image regions, the corresponding pixel region having a minimum error sum in pixel value between the corresponding pixel region and the each of the target image regions and corresponding to the similar target image regions; and
the selection unit is configured to set, as one of the corresponding points, a point corresponding to the corresponding pixel region.

7. The apparatus according to claim 1, wherein the searching unit includes a determining module configured to determine sequentially a difference between a change pattern of pixel values of each of image regions of the reference frame and the change pattern of pixel values of each of the target image regions to obtain plural differences, with one of horizontal and vertical coordinates fixed and the other of the horizontal and vertical coordinates changed, and determine that a coordinate included in the other of the horizontal and vertical coordinates and providing a minimum one of the differences in a preset range is a first one of the corresponding points; and a switching module configured to switch a fixed coordinate between the horizontal and vertical coordinates, and acquire a second one of the corresponding points by changing the coordinate other than the fixed coordinate.

8. The apparatus according to claim 1, wherein the computation unit is configured to set the pixel values of the high-resolution image as unknown values, establish conditional expressions in units of the sample values, and compute the pixel values of the high-resolution image by solving the conditional expressions as simultaneous equations, the conditional expressions indicating that provisional sample values computed from the unknown values be equal to the sample values.

9. The apparatus according to claim 8, wherein the searching unit is configured to fail to search the reference frame for the similar target image regions if a gradient of pixel values in a local pattern including one of the target pixels is lower than a preset value.

10. The apparatus according to claim 8, wherein the computation unit is configured to use, as the conditional expressions, conditional expressions indicating that a gradient of pixel values in a local pattern including one of the target pixels is greater than a preset value.

11. The apparatus according to claim 1, wherein the computation unit is configured to compute a value of each pixel of the high-resolution image as a weighted average of the sample values which include said each pixel of the high-resolution image and falls within a preset range.

12. The apparatus according to claim 11, wherein the searching unit is configured to fail to search the reference frame for the similar target image regions if a gradient of pixel values in a local pattern including one of the target pixels is lower than a preset value.

13. The apparatus according to claim 11, wherein the computation unit is configured to increase a weight for the weighted average as a gradient of pixel values in a local pattern including one of the target pixels.

14. The apparatus according to claim 13, wherein the computation unit is configured to compute the weighted average using only those of the sample values which are included in the local pattern including one of the target pixels, when the gradient of the pixel values in the local pattern is greater than a value.

15. The apparatus according to claim 1, wherein the selection unit is configured to detect a gradient direction of pixel values of each of the target pixels, and select the corresponding points in accordance with the detected gradient direction.

16. A high-resolution enabling apparatus comprising:
an acquisition unit configured to acquire, from an image source, an image represented by pixel values indicating brightness levels;
a division unit configured to divide one frame, included in the image, into a plurality of vertical or horizontal pixel lines;
a first setting unit configured to set, as a reference pixel line, one pixel line included in the pixel lines;
a second setting unit configured to sequentially set, to be a plurality of target pixels, a plurality of pixels included in one or more frames included in the image other than the reference pixel line, respectively;
a third setting unit configured to set a plurality of target image regions including the target pixels, respectively;
a searching unit configured to search the reference pixel line for a plurality of similar target image regions similar to each of the target image regions in a change pattern of pixel values;

a selection unit configured to select, from the similar target image regions of the reference pixel line, a plurality of corresponding points corresponding to each of the target pixels;

a fourth setting unit configured to set a plurality of sample values concerning brightness at the corresponding points to a pixel value of a target pixel corresponding to the corresponding points; and a computation unit configured to compute a plurality of pixel values included in a high resolution image corresponding to the reference pixel line, based on the sample values and the corresponding points, the high resolution image containing a larger number of pixels than pixels contained in the reference pixel line.

17. The apparatus according to claim 16, wherein:

if the division unit firstly divides the one frame into vertical pixel lines, the computation unit is configured to compute a plurality of pixel values, then the division unit is configured to divide the one frame into horizontal pixel lines, and the computation unit is configured to compute a plurality of pixel values; and if the division unit firstly divides the one frame into horizontal pixel lines, the computation unit is configured to compute a plurality of pixel values, then the division unit is configured to divide the one frame into vertical pixel lines, and the computation unit is configured to compute a plurality of pixel values.

18. A high-resolution enabling method implemented by a high-resolution enabling apparatus, the method comprising:

acquiring, from an image source, an image represented by pixel values indicating brightness levels;

setting, as a reference frame, one frame included in the image;

sequentially setting, to be a plurality of target pixels, a plurality of pixels included in one or more frames included in the image, respectively;

setting a plurality of target image regions including the target pixels, respectively;

searching the reference frame for a plurality of similar target image regions similar to each of the target image regions in a change pattern of pixel values;

selecting, from the similar target image regions of the reference frame, a plurality of corresponding points corresponding to each of the target pixels;

setting a plurality of sample values concerning brightness at the corresponding points to a pixel value of a target pixel corresponding to the corresponding points; and computing, by a high-resolution computation unit of the high-resolution enabling apparatus, a plurality of pixel values included in a high resolution image corresponding to the reference frame, based on the sample values and the corresponding points, the high resolution image containing a larger number of pixels than pixels contained in the reference frame.

19. A high-resolution enabling method implemented by a high-resolution enabling apparatus, the method comprising:

acquiring, from an image source, an image represented by pixel values indicating brightness levels;

dividing one frame, included in the image, into a plurality of vertical or horizontal pixel lines;

setting, as a reference pixel line, one pixel line included in the pixel lines;

sequentially setting, to be a plurality of target pixels, a plurality of pixels included in one or more frames included in the image other than the reference pixel line, respectively;

setting a plurality of target image regions including the target pixels, respectively;

searching the reference pixel line for a plurality of similar target image regions similar to each of the target image regions in a change pattern of pixel values;

selecting, from the similar target image regions of the reference pixel line, a plurality of corresponding points corresponding to each of the target pixels;

setting a plurality of sample values concerning brightness at the corresponding points to a pixel value of a target pixel corresponding to the corresponding points; and computing, by a high-resolution computation unit of the high-resolution enabling apparatus, a plurality of pixel values included in a high resolution image corresponding to the reference pixel line, based on the sample values and the corresponding points, the high resolution image containing a larger number of pixels than pixels contained in the reference pixel line.

* * * * *